(12) United States Patent
Gershony et al.

(10) Patent No.: US 6,266,079 B1
(45) Date of Patent: Jul. 24, 2001

(54) HALF-TONE DOT GENERATION

(75) Inventors: Moshe Abraham Gershony, Kear Saba; Ami Oren Peretz, Netanya, both of (IL)

(73) Assignee: Aprion Digital Ltd., Herzlia (IL)

( * ) Notice: Subject to any disclaimer, the term of this patent is extended or adjusted under 35 U.S.C. 154(b) by 0 days.

(21) Appl. No.: 09/087,797

(22) Filed: Jun. 1, 1998

(51) Int. Cl.[7] .................................... B41J 2/47
(52) U.S. Cl. .............................. 347/251; 347/252
(58) Field of Search ........................ 347/9, 11, 251, 347/252; 400/120.07, 76

(56) References Cited

U.S. PATENT DOCUMENTS

| 5,029,108 | 7/1991 | Lung ................................ 358/1.9 |
| 5,270,728 | 12/1993 | Lund et al. ........................ 347/5 |
| 5,480,240 | * 1/1996 | Bolash et al. ............... 400/124.01 |
| 5,519,792 | 5/1996 | Gershony ...................... 382/254 |
| 5,526,143 | 6/1996 | Gershony ...................... 358/455 |
| 5,600,351 | 2/1997 | Holstun et al. .................. 347/40 |
| 5,600,352 | * 2/1997 | Knierim et al. ................ 347/40 |
| 5,642,142 | 6/1997 | Bohorquez ...................... 347/15 |
| 5,691,828 | 11/1997 | Weiss et al. ................... 358/534 |
| 5,923,344 | * 7/1999 | Norum et al. .................... 347/9 |

* cited by examiner

*Primary Examiner*—Thinh Nguyen
(74) *Attorney, Agent, or Firm*—Mark M. Friedman

(57) ABSTRACT

For pulsed marking systems, where the marking is dot by dot, a method is disclosed for finer rendition of marked edges and finer control of the size and shape of half-tone spots, whereby the position of dots at boundaries of marked areas are variable. In particular, while most dots are marked at regularly spaced grid points, boundary dots may be marked displaced by various amounts to either side of a grid point, thereby shrinking or expanding the marked area. Specific techniques for generating appropriate dot displacement, in conjunction with known half-tone screening methods, are disclosed. Apparatus for carrying out marking and screening by a pulsed marking device, with fine position control of the edge of marked areas, is also disclosed.

19 Claims, 16 Drawing Sheets

SCAN DIRECTION

Rules for interpreting results of comparison of stored screen values with image values 1. If image value is equal to any value in the Blank subgroup, no dot is marked.

2. Else, if image value equals or exceeds any value in the Center subgroup, a dot is marked at the nominal position (i.e. at the grid point).

3. Else, if image value equals or exceeds any value in the Thresholds subgroup, a dot is marked at a position (relative to the grid point) that corresponds to the place, in the subgroup, of the highest threshold value exceeded: If this is the first place, the position is farthest to the left; if it is the second place, the position is a step less to the left than the first position, etc.; finally, if the highest exceeded value is at the last place in the subgroup, the dot position is furthest to the right of the grid point.

4. If also image value is equal to any value in the Inward subgroup, a dot is marked at the greatest distance from the grid point toward the center of the cell.

5. Else, (image value being less than any threshold value) no dot is marked

FIG. 5B

| SYSTEM (COLOR) VALUES | SPOT COVERAGE (DOT UNITS) |
|---|---|
| 0 | 0 |
| 1 | 1 |
| 2 | 1 2/5 |
| 3 | 1 4/5 |
| 4 | 2 1/5 |
| 5 | 2 3/5 |
| 6 | 3 |
| 7 | 3 2/5 |
| 8 | 3 4/5 |
| 9 | 4 1/5 |
| 10 | 4 3/5 |
| 11 | 5 |
| 12 | 5 2/5 |
| 13 | 5 4/5 |
| 14 | 6 1/5 |
| 15 | 6 3/5 |
| 16 | 7 |
| 17 | 7 2/5 |
| 18 | 7 4/5 |
| 19 | 8 1/5 |
| 20 | 8 3/5 |
| 21 | 9 |

FIG. 6B

| 105 | 104 | 103 | 102 | 101 | 75 | 74 | 73 | 72 | 71 | 65 | 65 | 65 | 65 | 65 | 66 | 67 | 68 | 69 | 70 | 96 | 97 | 98 | 99 | 100 |
|---|---|---|---|---|---|---|---|---|---|---|---|---|---|---|---|---|---|---|---|---|---|---|---|---|
| 85 | 84 | 83 | 82 | 81 | 22 | 21 | 20 | 19 | 18 | 7 | 7 | 7 | 7 | 7 | 8 | 9 | 10 | 11 | 12 | 76 | 77 | 78 | 79 | 80 |
| 38 | 37 | 36 | 35 | 34 | 17 | 16 | 15 | 14 | 13 | 1 | 1 | 1 | 1 | 1 | 2 | 3 | 4 | 5 | 6 | 39 | 40 | 41 | 42 | 43 |
| 54 | 53 | 52 | 51 | 50 | 33 | 32 | 31 | 30 | 29 | 23 | 23 | 23 | 23 | 23 | 24 | 25 | 26 | 27 | 28 | 45 | 46 | 47 | 48 | 49 |
| 90 | 89 | 88 | 87 | 86 | 64 | 63 | 62 | 61 | 60 | 44 | 44 | 44 | 44 | 44 | 55 | 56 | 57 | 58 | 59 | 91 | 92 | 93 | 94 | 95 |

FIG. 6C

FIG. 7

HALF-TONE DOT GENERATION

FIELD AND BACKGROUND OF THE INVENTION

The present invention relates to a method and an apparatus for generating half-tone dots for reproducing images on an ink-jet printer and, more particularly, to the generation of half-tone dots capable of conveying a large number of different tonal values.

In the art of printing it is generally known to reproduce images that originally contain areas of different tonal values by means of a screen-like two-dimensional pattern of inked (e.g. black) dots at regular intervals, the dots and the spaces therebetween being of variable proportions. Such reproduction is also referred to as half-tone reproduction; accordingly, the screen pattern and the dots are also referred to with the modifier "half-tone". In order to distinguish between half-tone dots and a different type of dot, to be discussed herebelow, the term half-tone spot, or, briefly, spot, will be used in the sequel. For a good quality image, there are, typically, about 150 half-tone spots to the inch. Color printing is typically effected by superposing four images, each with one of the four process-color inks. In order to minimize moire pattern effects, the screen patterns of the four images are mutually inclined at certain angles.

Digital printing devices typically generate an image by marking the printed medium, such as paper, with a regular pattern of contiguous parallel lines, each line varying between the values—"on" (marking) and "off" (blank)—according to the image. In some devices, such as ink-jet printers and printers using pulsed lasers, to be collectively referred to as discrete-dot marking devices, each marking line inherently consists of a series of contiguous elementary dots (to be referred to, briefly, as dots), each dot having a binary value (marking or non-marking— corresponding to having ink applied or not applied at its respective location). In some other devices, such as those using continuously radiating lasers for marking, a marked segment of a line may be continuous, but the algorithm for switching between marking—and non-marking states is based, in effect, on a model of contiguous discrete bi-valued dots—thus, again, forming a two-dimensional array of dots. The necessarily finite spatial frequency of marking lines, and of dots within a marking line, causes certain limitations on achievable image quality—especially with respect to half-tone images, as will be discussed herebelow, and it is the challenge of improving image quality in face of such limitations that is answered by the present invention. It is noted that there are also digital marking devices that, rather than directly print an image on a print medium, serve to create a latent image on a printing plate, which subsequently serves in a printing press. Most of what is discussed and disclosed in the present specification applies to such marking devices as well.

There are many methods known in the art for converting a digitally-represented multi-valued image into a half-tone pattern that is suitable for reproduction by a binary marking device (which conversion process is also referred to as digital screening, or, in short, screening). According to one such method (to be referred to herebelow as method A), in common usage and useful for a marking scheme that is based on the model of discrete dots along marking lines, there is stored a two-dimensional matrix of threshold values, one value per dot location, which represents the screen function at the appropriate angular orientation. For each dot of the half-tone image the corresponding threshold value is compared with the original image value and the result of the comparison determines the (binary) dot value. For certain angles of orientation (namely those whose tangent is a rational number), the screen function can be made to be repetitive in both dimensions, so that a threshold matrix corresponding to only one (repetitive) segment of the screen function need be stored. This method has several drawbacks:

(1) It is practically limited to rational-tangent angles;

(2) for desirable rational-tangent angles, a relatively large amount of values (corresponding to a large segment, as well as to the number of such different screen angles to be implemented) need be stored;, and (3) there is a variance in size and shape among neighboring spots, resulting in visual artifacts.

Another known rational-tangent angled screening method suitable for discrete dot marking (to be referred to herebelow as method B), has a binary dot pattern over a (repetitive) segment stored for each possible image value. For each image pixel, the dot pattern corresponding to its value and to its relative position in the segment is read out and fed to the marking device. This method shares the first three drawbacks of method A, listed hereabove, and even requires greater storage capacity, but, advantageously, is not limited to monotoniccally increasing spots; rather, there is total independence between the spot shapes at various tone values.

The discrete dot structure entails another drawback for screening, though it is not very pronounced for high resolution devices, such as those using laser beams for marking. In the latter there are, typically, about 2000 lines to the inch, and that same frequency of dots (if indeed so structured). With such devices, each spot of a half-tone screen of, said, 175 spots to the inch (which is typically used for high quality printing) contains, on the average, about $(2000/175) \times (2000/175) = 131$ dots. Since the dots are binary valued, each spot can thus have 132 values of proportional area (from totally blank to totally marking). Thus image details as fine as the size of a single spot can be reproduced at any of only 132 shades of gray; and, conversely, an area of an image that has uniformly a shade of any value, out of only 132 values, can be uniformly reproduced down to the screen structure and excluding small variations among neighboring spots due to the screening method (such as the one described hereabove). With devices of continuous marking capability, such as those utilizing continuous-radiation lasers, the number of tonal values and the spot uniformity can be further increased if the dot structure along lines is abandoned and screening methods, such as those taught by the following three patents, are adopted.

U.S. Pat. No. 5,519,792 teaches storing the screen function as a matrix of threshold values that is independent of the marking grid structure and of the orientation angle of the half-tone pattern to be marked, reading out values from the stored matrix along a line that corresponds to a marking line and to the orientation angle, comparing them to a corresponding image value and, where, between any successive points, the sense of the comparison switches, calculating, by interpolation, the exact location, along the marking line, of a boundary between marking- and non-marking segments.

U.S. Pat. No. 5,526,143 teaches a screening technique similar to that of the '792 patent, except that the succession of threshold values is calculated on the fly and that it, as well as the succession of image values, are converted to corresponding successions of analog values; these are interpolated, to create corresponding smooth signals, which are then mutually compared, the point at which the sense of the comparison switches determining the boundary between marking- and non-marking segments.

U.S. Pat. No. 5,691,828 teaches storing the screen function, at any given orientation angle, as relative locations of boundary points of spots along lines parallel to the marking lines (the storage being arranged according to tonal values corresponding to various spot shapes and sizes) and reading out these values to determine boundary points along any marking line.

The methods of the three patents, briefly described hereabove, are suitable for continuous marking devices, such as those using a continuous laser beam, and their main advantage is the possibility of delineating each half-tone spot at a much greater resolution than implied by the spatial line frequency of the marking device. They largely overcome the drawbacks listed for the previously described methods (A and B) and enable defining the size and shape of any marked spot with any desired precision and thus reproduce any desired number of tonal values.

In the case of an ink-jet printer, each elementary marking dot is, typically, produced by an elementary drop of ink, contiguous dots being produced by consecutive drops that are ejected from a nozzle at regular intervals while the nozzle travels with respect to the medium along a marking line. Usually, there is a plurality of nozzles, from which drops are ejected along corresponding parallel marking lines. The distance between adjacent marking lines determines the spatial dot frequency in one dimension (referred to as the cross-scan dimension), while the ratio of drop ejection frequency to the scanning speed (which is the speed of travel of the nozzles with respect to the medium) determines the spatial dot frequency along the other (in-scan) dimension. In current art, the highest cross-scan frequency is about 720 dots to the inch and it is the common practice to make this also to be the in-scan frequency. Higher spatial frequencies are possible, but at the expense of higher equipment complexity and, thus, costs, or at the expense of lower overall marking speed. For example, the in-scan spatial frequency may be doubled (as is, indeed, offered in some models), by halving the scan speed—which, of course, halves the overall marking rate.

In a half-tone screen of, say, 144 spots to the inch, produced by a 720 dots/inch device, each spot contains, on the average, 5×5=25 dots. Each spot can thus reproduce only 26 shades. In order to reproduce a greater number of shades in an image, it is a common practice to obtain any desired shade value by averaging the values of a group of adjacent spots. For example, for the mentioned screen of 144 spots to the inch, one can group every 3×3 adjacent spots, to jointly reproduce any of 9×26=234 shades. When using rational-tangent angle screening methods (such as methods A and B hereabove), this multi-spot grouping for achieving a large number of shades is part of the designed screening function within a (repetitive) segment. In practice, all such grouping, and the distribution of shade values among spots in a group,, disadvantageously produce a pattern of commensurately lower spatial frequencies, which may become visible under certain circumstances. It may become particularly visible where the image contains some fine detail of a repetitive nature, which may beat (i.e. cause moire patterns) with the grouping pattern. It is, therefore, desirable to be able to finely vary the size of each half-tone spot so that it can, by itself, reproduce any of a large number of shades (as would, to some extent, be possible with higher resolution devices, as was discussed hereabove with respect to laser-based devices). Because of the discrete nature of the ink drops, the dot structure along lines is inherent to this printing technique (that is—ink-jet printers are of the discrete-dot marking type), so that the improved half-tone screening methods of the '792, the '143 and the '828 patents (which call for finely positioning the boundaries between marking and non-marking segments), described hereabove, cannot be directly applied. It is noted that this problem becomes more acute the lower the inherent resolution (i.e. spatial dot frequency) of the ink-jet printer. It is further noted that a similar problem may exist in any low-resolution marking device, such as a thermal printer or a magneto-graphic device, if the mark switching along a line is done only at time points that correspond essentially to whole dot positions, thus also producing discrete dots. It is further noted that the problem may, to some extent, be also significant with discrete-dot marking devices of inherently high resolution, such as those using pulsed lasers, and may become serious if, for some reasons, it proves to be advantageous to operate them at lower resolutions (for example—to increase overall marking speed).

For such low resolution discrete-dot marking devices, it has been common practice to use irregular scattered dot patterns for half-tone rendering. There are many methods for creating such patterns, but all suffer, to a greater or lesser extent, from a fundamental drawback. namely that the patterns inherently contain relatively low spatial frequencies, which cause disturbing visual effects.

Another drawback of low-resolution marking devices is that inclined boundaries between marked and unmarked areas (e.g. edges of graphic objects), for example, as illustrated in FIG. 1A, are formed as stairs, which may be visible. Likewise, the boundaries of half-tone spots are formed as stairs, imparting to each spot a shape of a generally very irregular polygon, as shown, for example, in FIG. 1B. Such a shape typically includes protrusions and many near-right angles. Because of the complex nature of the interaction between the ink drops and the medium (e.g. paper), which includes joining of adjacent drops, on the one hand, and diffusion into the medium, on the other hand, such shapes tend to cause considerable non-linearity in the relation between the number of drops (i.e. nominal number of marking dots) and the actually marked area (or the obtained average optical density), as well as a great deal of variability. It is, therefore, desirable to produce half-tone spots that have as nearly regular shapes as possible. It is again noted that this problem becomes more acute with decreasing dot frequencies and may be common also with marking devices other than of the ink-jet type.

An obvious way to achieve more shade values, as well as to improve the shape of a spot, is to increase the spatial dot frequency. As was noted hereabove, it is possible to increase the spatial frequency, at least along the in-scan dimension, by slowing the scan rate or increasing the drop ejection frequency. Slowing the scan rate disadvantageously results in slower overall operation; increasing the drop frequency may be limited technologically. Both approaches result in increased ink density, which may be undesirable. U.S. Pat. No. 5,270,728 teaches a method to partially overcome the limitation on drop frequency and the increased density problem, while effectively doubling the in-scan dot frequency. According to this method, some (possible half) of the dots inside a marked area are deliberately set to blank value (i.e. the respective drops are inhibited from being ejected), while dots at the boundaries of such an area are made to always have a marking value. It is noted that even doubling the in-scan dot frequency (which seems to be the maximum achievable, in practice), while reducing some of the stairs effects at edges of objects and of half-tone spots, is still far from providing the desired possible number of shades per half-tone spot. In the aforementioned example of a 144 spots/inch screen, the number of shades would be only increased to 51.

U.S. Pat. No. 5,029,108 teaches a method for considerably reducing the stairs effects along edges of graphic objects, by modifying the size and relative position of certain dots along such edges, thus finely controlling the beginning and end of each dot and thereby creating commensurately smaller stairs. This method is, again, particularly applicable to electrophotographic devices (which use lasers for marking) and is generally not applicable to ink-jet devices, since it is difficult to appreciably vary the size of ejected drops, especially when their rate is already set near the highest possible value.

It is, moreover, noted that both the '728 and the '108 patents address only the issue of the formation of edges of binary-valued graphic elements and not, specifically, the issues attending the formation of half-tone spots, as discussed hereabove. In particular, they do not address the problem of the irregularly shaped spots (though they may indirectly and partially alleviate the problem) and, more importantly, do not address the problem of the limited number of shades reproducible by any one spot. The latter point may be illustrated by the following observation: Consider applying the method of either of the two patents to a half-tone image that has been screened according to the inherent resolution of the device; the edges of the spots would be modified according to the method and may indeed look somewhat smoother; their average positions, however, and therefore also their respective marking areas, will remain substantially unaltered, the marking areas still assuming one of the limited number of possible values.

There is thus a widely recognized need for, and it would be highly advantageous to have, a method for generating half-tone spots for low-dot-frequency marking devices, such as ink-jet printers, whereby the spots would have relatively regular shapes and their marking areas would assume any of a relatively large number of values.

SUMMARY OF THE INVENTION

The present invention successfully addresses the shortcomings of the presently known configurations by providing a method and apparatus for rendering binary valued (e.g. black and white) images, in general, and half-tone (screened) images, in particular, using pulsed marking devices, with smoother edges than is possible with method and apparatus of prior art. Moreover, half-tone spots, rendered according to the present invention, may assume a much larger number of values of relative marked area, and thus enable rendering a much larger number of tone levels, then heretofore possible.

The present invention discloses a novel technique for finely controlling the position of the edge of a marked area, by controlling the position, along the marking line, of the corresponding boundary dot, with a resolution much finer than the normal pitch of marked dots.

More specifically, the method, or apparatus, of the present invention calls for positioning the center of a boundary dot, along the marking line, at a distance from the center of the adjacent dot such that is not necessarily the regular pitch between other mutually adjacent dots, but may be greater or lesser than the pitch. Thus, when the distance is less than the pitch, the dot, and with it the corresponding edge of the marked area, is displaced inwards from its normal (grid-point) position toward the marked area, reducing the latter commensurately. Conversely, when the distance is greater than the pitch, the dot, and with it the corresponding edge of the marked area, is displaced outwards from the grid point away from the marked area, enlarging the latter commensurately. The displacement, in either direction, is usually a fraction of a pitch.

The effect of boundary dot displacement is achieved by timing the corresponding drive pulse, during the marking process, at a time interval from the adjacent drive pulse, such that may be different from the regular interval occuring between most other mutually adjacent pulses. Usually the drive pulses are derived by imagewise gating a train of regularly spaced clock pulses, but in the case of a displaced boundary dot, the corresponding drive pulse is advanced or delayed (retarded). For example, if a boundary dot at the beginning of a marked segment is to be displaced inwards, the corresponding drive pulse is delayed, whereas if a boundary dot at the end of a marked segment is to be displaced inwards, the corresponding drive pulse is advanced. The reverse occurs in the case of outward dot displacement.

This technique is particularly useful in controlling the relative areas (i.e. percentage mark coverage) of half-tone spots and, according to the present invention, is applied to significantly modify various screening methods of prior art. Particular modified methods described, all of which assume a stored screening function, defined over a section of the image area, which section repeats itself as an array, include:

(1) The screening function is represented by a matrix of groups of values, each group relating to a possible dot within the section and consisting of a plurality of threshold values and, possibly some control values. Prior to marking any dot, the respective group of values is retrieved and compared with a corresponding pixel value. According to the result, a drive pulse is either not generated or is generated synchronously with a clock pulse or generated at some specified interval from a clock pulse.

(2) The screening function is represented by a plurality of matrices, each related to a possible pixel value and consisting of an array of marking values—one value per possible dot within the section. Prior to marking any dot, the matrix corresponding to the pixel value is retrieved and the respective marking value specifies whether the respective drive pulse should be generated and, if so—at what positive or negative interval, if at all, relative to a clock pulse.

(3) The screening function is represented by a plurality of arrays, each related to a possible pixel value and consisting of groups of position values, one group per marking line within the section, each value related to one boundary dot within the section. During the marking of any line, the array corresponding to each pixel value, along the line, is retrieved and a boundary drive pulse is generated for each position value along the respective line, at a commensurate timing (relative to the section). Additional pulses are generated, synchronously with clock pulses, between pairs of boundary pulses. According to a variation of this method, the additional pulses are generated so that all intervals between pulses are equal.

(4) The screening function is represented by a matrix of threshold vaues. During the marking of any line, A sequence of threshold vaues corresponding to the line is retrieved fromm storage and converted to an analog signal. At the same time, a sequence of pixel values corresponding to the line is obtained and, likewise, converted to an analog signal. The two analog signals are continuously compared and a binary marking signal is generated accordingly. For each transition of the marking signal, a drive pulse is generated. Additionally, a drive pulse is generated at each clock pulse that occurs while the marking signal is in a "mark" state, except at close proximity to a transition.

According to the present invention there is provided a method for rendering an electrically input image on a medium by a marking device that is operative, in response to, and synchronous with, drive pulses applied thereto, to selectively mark dots on the medium, each dot uniquely corresponding to an applied drive pulse, contiguous marked dots forming marked areas and any dot in a marked area that is adjacent to an unmarked area being a boundary dot, the method comprising:

defining over the plane of the image a raster of regularly spaced grid lines and, along each line, a pattern of grid points, spaced at a constant pitch, applying drive pulses to the device, for marking dots on the medium, each dot to be uniquely associated with one of the grid points, the pulses being timed so that the center of at least one boundary dot is essentially displaced from its associated grid point and so that the centers of all dots within a marked area that are not boundary dots lie essentially at corresponding grid points.

When the marking device is operative to scan the medium at constant scanning velocity, the method further comprises:

generating a train of regularly spaced clock pulses, their period being equal to the constant pitch divided by the scanning velocity;

for each dot to be marked with its center at a grid point, generating a drive pulse in synchronism with one of the clock pulses, and for each dot to be marked with its center displaced from its associated grid point, generating a drive pulse at a commensurate time difference from a corresponding one of the clock pulses.

When the input image is represented by a binary signal, which alternates between a marking state and a non-marking state and when the marking device is also operative to scan the medium along parallel lines at constant scanning velocity, the method further comprises:

generating a train of regularly spaced clock pulses, their period being equal to the constant pitch divided by the scanning velocity;

generating a drive pulse upon each state transition, in the binary signal, and a drive pulse for each of the clock pulses that occurs during a marking state of the binary signal and that is not closer than a specified minimal interval to the time of any state transition in the binary signal.

When at least a portion of the rendered image is a half-tone image, contiguous marked areas therein forming half-tone spots within screen cells, the method further comprises determining the direction and magnitude of displacement of any of the at least one boundary dot so as to at least partially affect the shape of the corresponding half-tone spot.

According to another aspect of the present invention, there is provided a method for rendering an electrically input image, generally represented by an array of pixels, as a half-tone image on a medium, by a marking device that is operative, in response to drive pulses applied thereto, to selectively mark dots on the medium, along each line of a raster of parallel lines, each dot uniquely corresponding to, and synchronous with, an applied drive pulse, clusters of adjacent marked dots, along any line, forming marked segments, any two successive marked segments being separated by unmarked segments and a dot in a marked segment that is adjacent to an unmarked segment being a boundary dot, the method comprising:

applying drive pulses to the device, for selectively marking dots on the medium, the pulses being timed so that the center-to-center distance, along a line, within at least one first pair of adjacent marked dots is essentially different from the center-to-center distance, along a line, within at least one second pair of adjacent marked dots along a line.

According to further features of the invention described below, at least one dot of each of the at least one first pair if a boundary dot and the method further comprises:

defining, along each line, a plurality of grid points, spaced at a constant pitch, and uniquely associating each marked dot with one of the grid points;

further timing the drive pulses so that the centers of both dots of any of the at least one second pair lie essentially at corresponding grid points and the center of at least one boundary dot lies essentially displaced from its corresponding grid point.

According to one embodiment of the invention, the method further comprises:

defining a screening function, over the area of the rendered image, as a repetitive array of adjacent identical elementary screening functions, each defined over a section of the area;

for each grid point within any of the sections, storing a plurality of threshold values, in conformity with the elementary screening function; and for each grid point along a line:
retrieving corresponding threshold values from storage and comparing them with the value of the corresponding pixel;
from the results of the comparisons, determining whether a dot is to be marked and, if yes—at what position, with respect to the grid point, should its center be; and
if a dot is to be marked, further timing the corresponding drive pulse so that the center of the dot falls at the position thus determined.

According to an alternative embodiment of the invention, the method further comprises:

for each possible pixel value, storing an array of marking values, one marking value for each grid point within the section, in conformity with the elementary screening function;

for each grid point along a line:
retrieving the corresponding marking value from storage and determining accordingly whether a dot is to be marked and, if yes—at what position, with respect to the grid point, should its center be; and
if a dot is to be marked, further timing the corresponding drive pulse so that the center of the dot falls at the position thus determined.

According to another alternative embodiment of the invention, the method further comprises:

for each possible pixel value, storing a plurality of position values in conformity with the elementary screening function, each position value representing a position of the center of a boundary dot with respect to the section;

for each repetition of the section along each marking line, retrieving corresponding position values from storage;

for each position value retrieved, applying a drive pulse to the device, timed so as to mark a boundary dot at a corresponding position along the respective marking line, the position not being necessarily at a grid point;

applying additional drive pulses to the device, timed so as to mark corresponding additional dots between sequential boundary dots, each additional dot being centered on its associated grid point or, alternatively, all additional dots and the boundary dots are essentially equidistant.

According to yet another alternative embodiment of the invention, the input image is represented by a continuous image signal along each line of the raster and the method further comprises:

generating a continuous screening signal, representing a screening function;

generating a train of regularly spaced clock pulses, their period being equal to the constant pitch divided by the scanning velocity; and for each raster line:
comparing the image signal with the screening signal and accordingly generating a binary signal, which alternates between a marking state and a non-marking state; and generating a drive pulse upon each state transition, in the binary signal, and a drive pulse for each of the clock pulses that occurs during a marking state of the binary signal and that is not closer than a specified minimal interval to the time of any state transition in the binary signal.

According to the present invention there is also provided a system for rendering an electrically input image on a medium, comprising:

a marking device, operative to scan the medium, along each line of a raster of parallel lines, at constant scanning velocity and further operative, in response to, and synchronously with, drive pulses applied thereto, to selectively mark dots on the medium, each dot uniquely corresponding to an applied drive pulse, contiguous marked dots forming marked areas and any dot in a marked area that is adjacent to an unmarked area being a boundary dot; and a pulse generator, for applying drive pulses to the marking device, including:
a generator of regularly spaced clock pulses; and
a pulse gating circuit, receptive to the clock pulses and operative to output a drive pulse, synchronous with one of the clock pulses, for each dot to be marked that is not a boundary dot, and a drive pulse that is not necessarily synchronous with any of the clock pulses, for at least one dot to be marked that is a boundary dot.

According to further features of the invention, when the input image is represented by a binary signal, which alternates between a marking state and a non-marking state, the pulse gating circuit is further operative to output:

a drive pulse that is not necessarily synchronous with any of the clock pulses for each state transition in the binary signal; and a drive pulse synchronous with any of the clock pulses that occurs during a marking state of the binary signal and not closer than a specified minimal interval to the time of any state transition in the binary signal.

According to still further features of the invention, when at least a portion of the input image may be rendered as a half-tone image and the medium to be marked may be conceptually divided into an array of contiguous sections, the system further comprises a screen generator, including storage of a screening function, defined over the area of a section, the screen generator being operative to repeatedly read out values from the storage and to control the pulse generator in conformance with the screening function.

According to a preferred embodiment of the system described below, the screening function is represented by an array of groups of N threshold values each, where N>1, and the screen generator— further includes N comparators and a logic circuit, receptive to outputs of all the comparators, and is further operative to retrieve from the storage one complete group of the threshold values just prior to each of the clock pulses and to apply each of the retrieved threshold values to a corresponding one of the comparators;

each of the comparators being operative to compare one of the threshold values with a corresponding pixel value and the logic circuit being operative to control the pulse gating circuit according to the outputs of the N comparators.

According to another embodiment, the screening function is represented by one array of marking values for each possible pixel value, each marking value in any array being from a finite set of values and uniquely corresponding to a possibly marked dot within any section of the marking area, and the screen generator is further operative, with respect to each possible dot and to any input pixel to be rendered thereby, to:

address a location in the storage that corresponds to the value of the respective pixel;

retrieve from an addressed storage location a marking value, corresponding to the dot; and control the outputting of a corresponding drive pulse and its timing, with respect to a nearest clock pules, according to the retrieved marking value.

According to an alternative embodiment, the screening function is represented by one array of position values for each possible pixel value, each position value in any array indicating the position, within any section, of a boundary dot to be marked, and the screen generator is further operative, with respect to any line, along which the device is scanning, with respect to any of the sections across which the device is scanning and with respect to any input pixel to be rendered therein:

to address a location in the storage that corresponds to the respective pixel;

to retrieve from an addressed storage location all position values relating to the position of the line, with respect to the section;

for each retrieved value, to cause the pulse gating circuit to output a drive pulse that is not necessarily synchronous with any of the clocked pules, it being a boundary drive pulse, whose timing with respect to the scanning of the section, is commensurate with the retrieved position value; and while the device is scanning any area to be marked, to cause the pulse gating circuit to output additional drive pulses, synchronously with corresponding ones of the clock pulses.

According to a variation of the alternative embodiment, the screen generator is further operative, for any pair of consecutive retrieved position values that indicate the beginning and end, respectively of a segment to be marked, to cause the pulse generator to output a train of regularly spaced drive pulses, such that the timing of each of the first pulse and the last pulse of the train, relative to the scanning of the section, corresponds to the respective one of the position values.

According to another alternative embodiment, when the input image is represented by a continuous analog image signal along each line of the raster, the screening function is represented by an array of threshold values and the screen generator further includes an analog signal generator and a comparator, receptive to the image signal and to the output of the analog signal generator and connected at its output to the pulse gating circuit;

the screen generator being further operative, with respect to any line, along which the device is scanning and with respect to any of the sections across which the device is scanning, to:

retrieve from the storage location all threshold values corresponding to the line, as it relates to the section; and apply all retrieve threshold values to the analog signal generator, for generating a continuous threshold signal;

the comparator being operative to compare the image signal with the threshold signal and accordingly to generate a binary signal, which alternates between a marking state and a non-marking state; and the pulse gating circuit being further operative to output;

a drive pulse that is not necessarily synchronous with any of the clock pulses for each state transition in the binary signal, and a drive pulse synchronous with any of the clock pulses, if it occurs during a marking state of the binary signal and is not closer than a specified minimal interval to the time of any state transition in the binary signal.

BRIEF DESCRIPTION OF THE DRAWINGS

The invention is herein described, by way of example only, with reference to the accompanying drawings, wherein:

FIG. 5B is a table, defining the operation of the control logic module in the circuit of FIG. 5A.

FIG. 6B is a listing of nominal spot areas resulting from the matrix of FIG. 6A.

FIG. 6C shows an example of a stored matrix of values for an alternative embodiment of the present invention.

FIG. 7 shows an example of a set of matrices for yet another embodiment of the present invention.

DESCRIPTION OF THE PREFERRED EMBODIMENTS

The present invention is of a method for generating half-tone spots for low-dot-frequency discrete-dot marking devices, such as ink-jet printers, whereby the spots would have relatively regular shapes and their marking areas would assume any of a relatively large number of values.

Specifically, the present invention can be used to cause ink-jet printers, especially of the drop-on-demand type, to reliably reproduce finely screened half-tone images with any number of tonal shades and with minimal artifacts. Additionally, the present invention can be used to cause certain edges of graphic objects marked by such printers to become relatively smooth.

The principles and operation of a half-tone screening method and of an edge smoothing method according to the present invention may be better understood with reference to the drawings and the accompanying drawings.

Figure 1A:
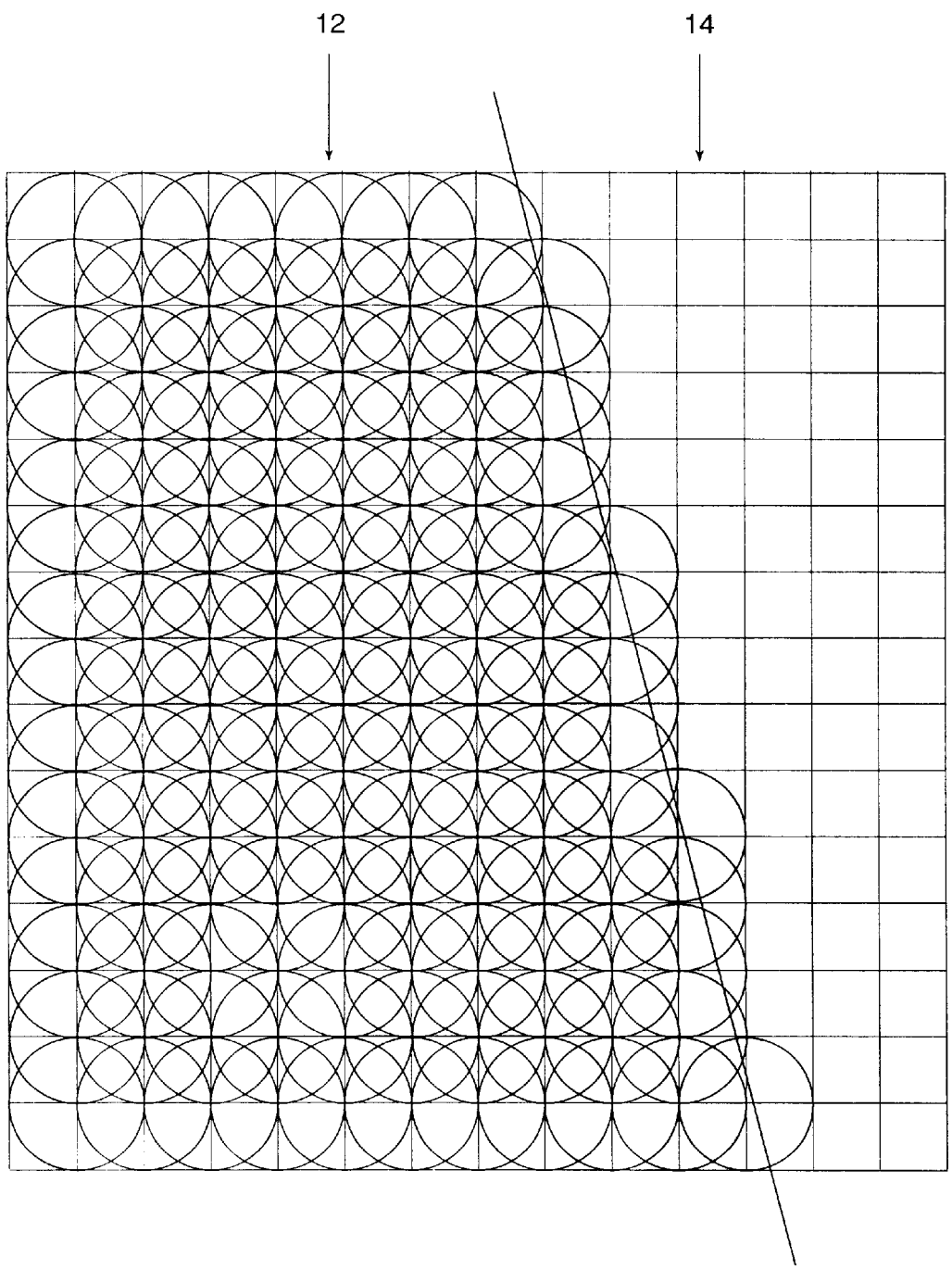
FIGS. 1A and 1B are illustrations of a marking scheme of an edge of a graphic element and of a typical half-tone spot, respectively, according to prior art.
Figure 1C:
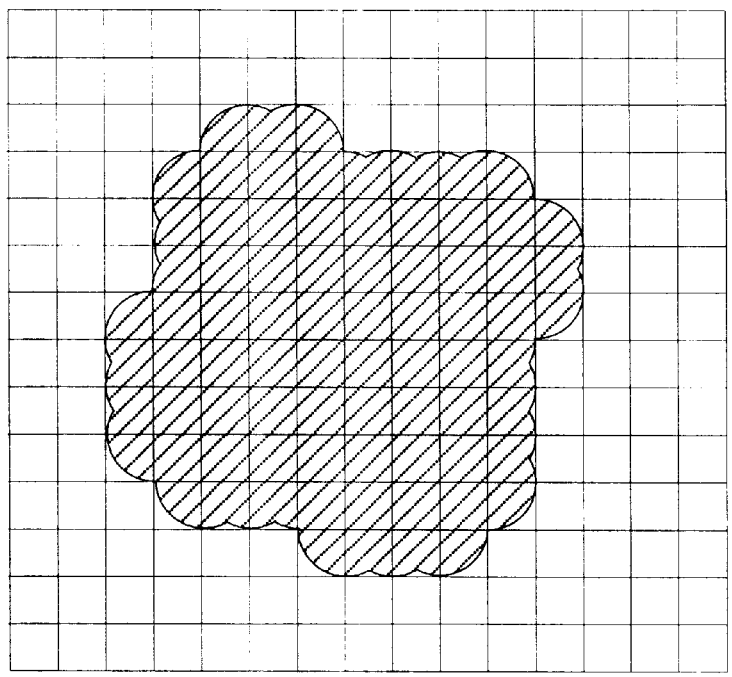
FIG. 1C is an illustration of a marked spot resulting from the scheme of FIG. 1B.
Figure 2A:
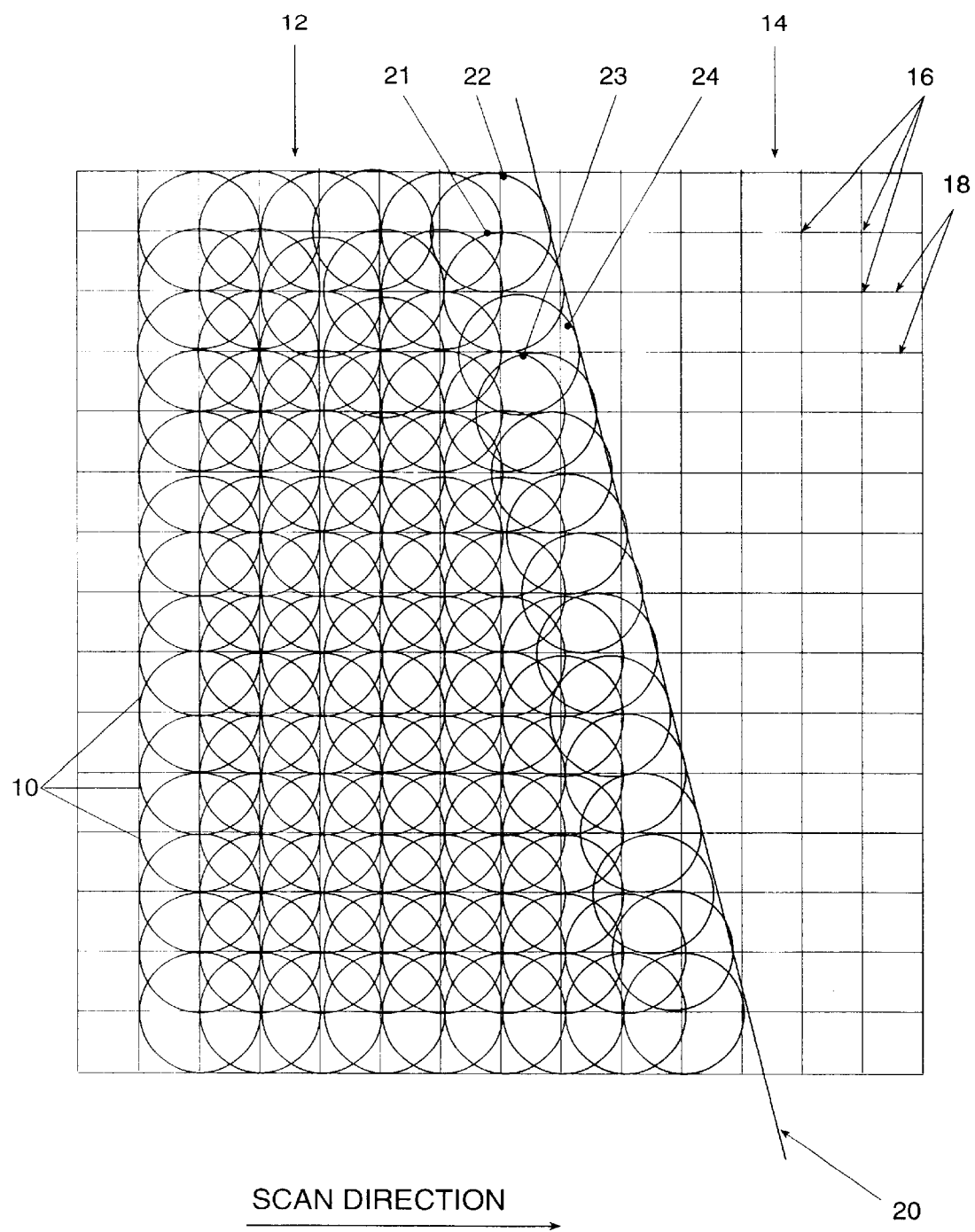
FIGS. 2A and 2B illustrate a marking scheme with dot position control, according to the present invention, as applied to the edge of a graphic element and the half-tone spot of FIGS. 1A and 1B, respectively.

Referring now to the drawings, FIG. 2A illustrates the marking scheme within a section of an image that contains a boundary between a marked area 12 and a non-marked area 14 (i.e. an edge of a graphic object), which section is generally similar to that illustrated in FIG. 1A. Each circle 10 represents the nominal boundary of a dot—for example, the edge of the spread mark of an ink drop (as determined by some density threshold value). Over most of the marked area, the dots are centered about a regular grid of points 16, to be referred to as grid points, which are arranged at regular intervals along nominal marking lines 18, as in the case with typical printing methods according to prior art (and as is true over the entire marked area in the example illustrated in FIG. 1A). For most dots, therefore, grid points 16 form nominal dot positions. Some dots along the boundary, however, are centered on points along their respective marking lines that are not on the aforementioned regular grid, i.e. not at their nominal dot positions. For example, dot 22 is centered about point 21, which is seen to be slightly left of a grid point. Similarly, dot 24 is centered about point 23, which is seen to be slightly right of a grid point. In general, a dot at the boundary, to be called boundary dot, may be centered about any point to the left, or to the right of its nominal position (which is at a grid point). The algebraic difference between the actual dot position and its nominal position will be termed dot displacement and will be considered outward if the displacement is in the direction of the unmarked area, and inward—if displaced in the direction of the marked area. In the example of FIG. 2A it is readily seen that, by appropriately displacing each relevant boundary dot, the boundary between the two areas 12 and 14 assumes a relatively smooth line that approximates an ideal boundary line 20 (which, in this case, is straight). This should be compared with the more ragged edge, obtained in prior art, as illustrated in FIG. 1A.

Clearly, any adjacent dot overlap, thus forming a continuously marked area. The required total extent of possible dot displacement is equal to the pitch, P, of the grid (that is—the distance between adjacent nominal dot positions along a marking line). Displacement may, for example, range from −P/2 to +P/2, but other ranges may be preferable—depending on the overlap between dots. Thus, for example, if there is little overlap, the outward range would be smaller, say P/3, and the inward range—commensurately larger, i.e. 2P/3.

In conventionally operated drop-on-demand ink-jet printers, drops are ejected, wherever marking is demanded, at regularly spaced time points (usually determined by clock pulses), thus marking dots at regularly spaced grid points (owing to the constant velocity between the print head and the medium). Displacement according to the present invention is effected by appropriately retarding or advancing the time of drop ejection, e.g. by retarding or advancing the drive pulse. An outward displacement thus corresponds to a longer gap between the respective pulse and its (only) neighbor, while an inward displacement corresponds to a shorter gap. It will be appreciated that also in other discrete-dot marking devices, such as those using pulsed lasers, dot displacement may be effected by appropriate modification (i.e. retarding or advancing) of the advance timing of corresponding drive pulses.

Figure 1B:
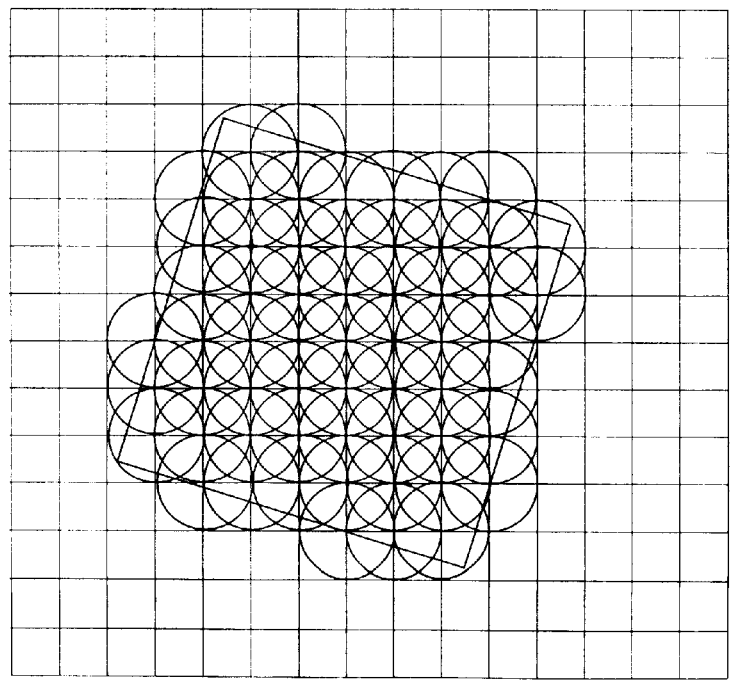
Figure 2C:
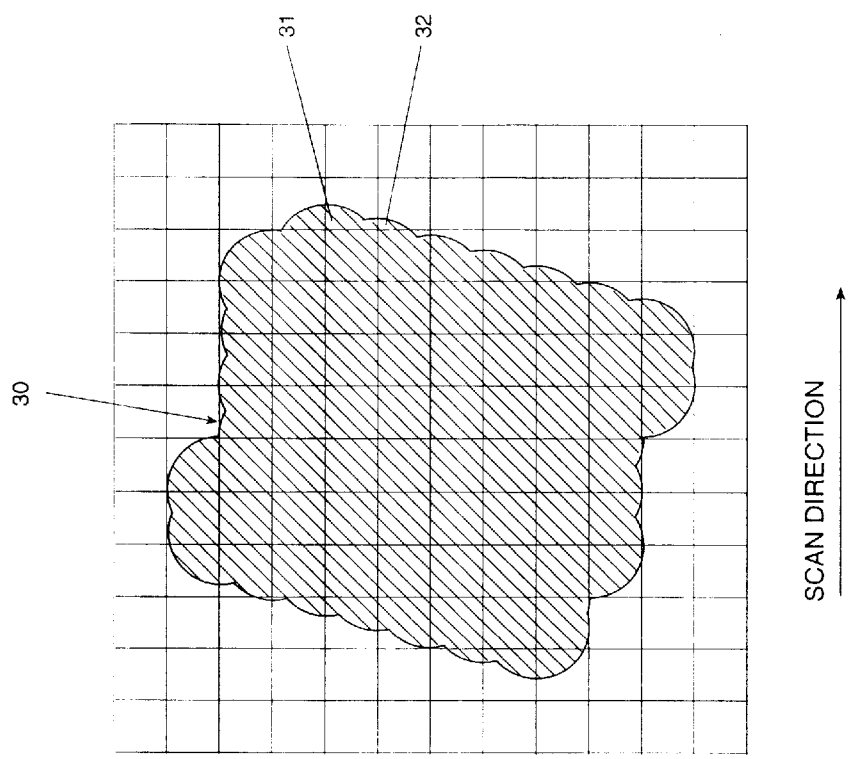
FIG. 2C illustrates a marked spot resulting from the scheme of FIG. 2B.
Figure 2B:
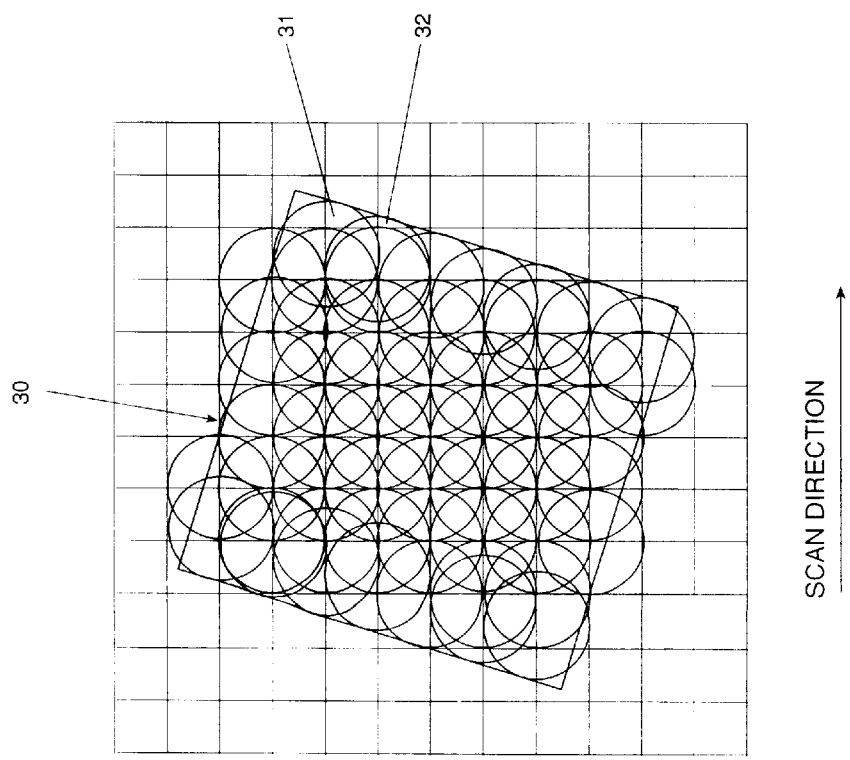
Figure 3A:
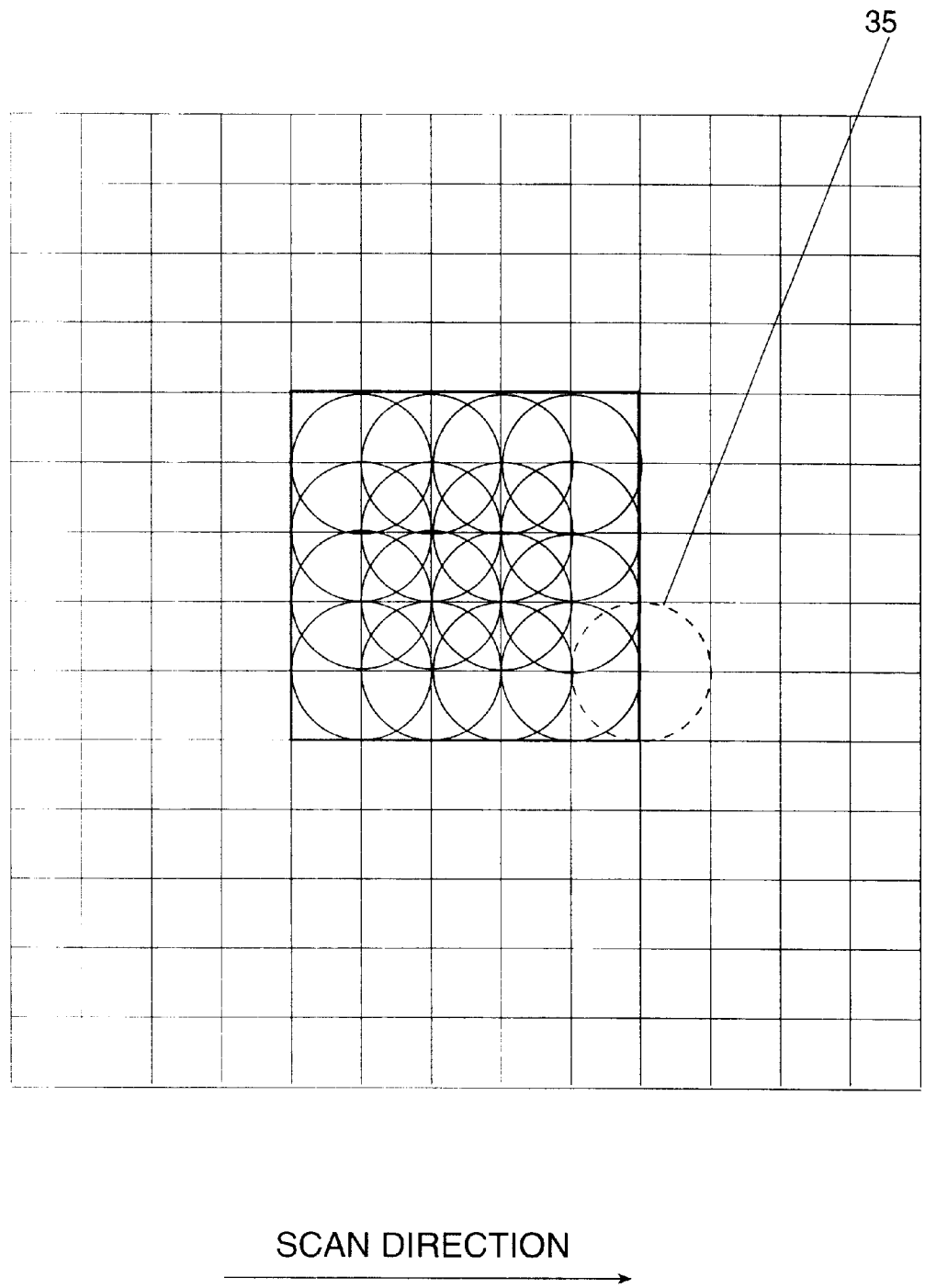
FIG. 3A is an illustrations of a marking scheme of another typical half-tone spot according to prior art.
Figure 3B:
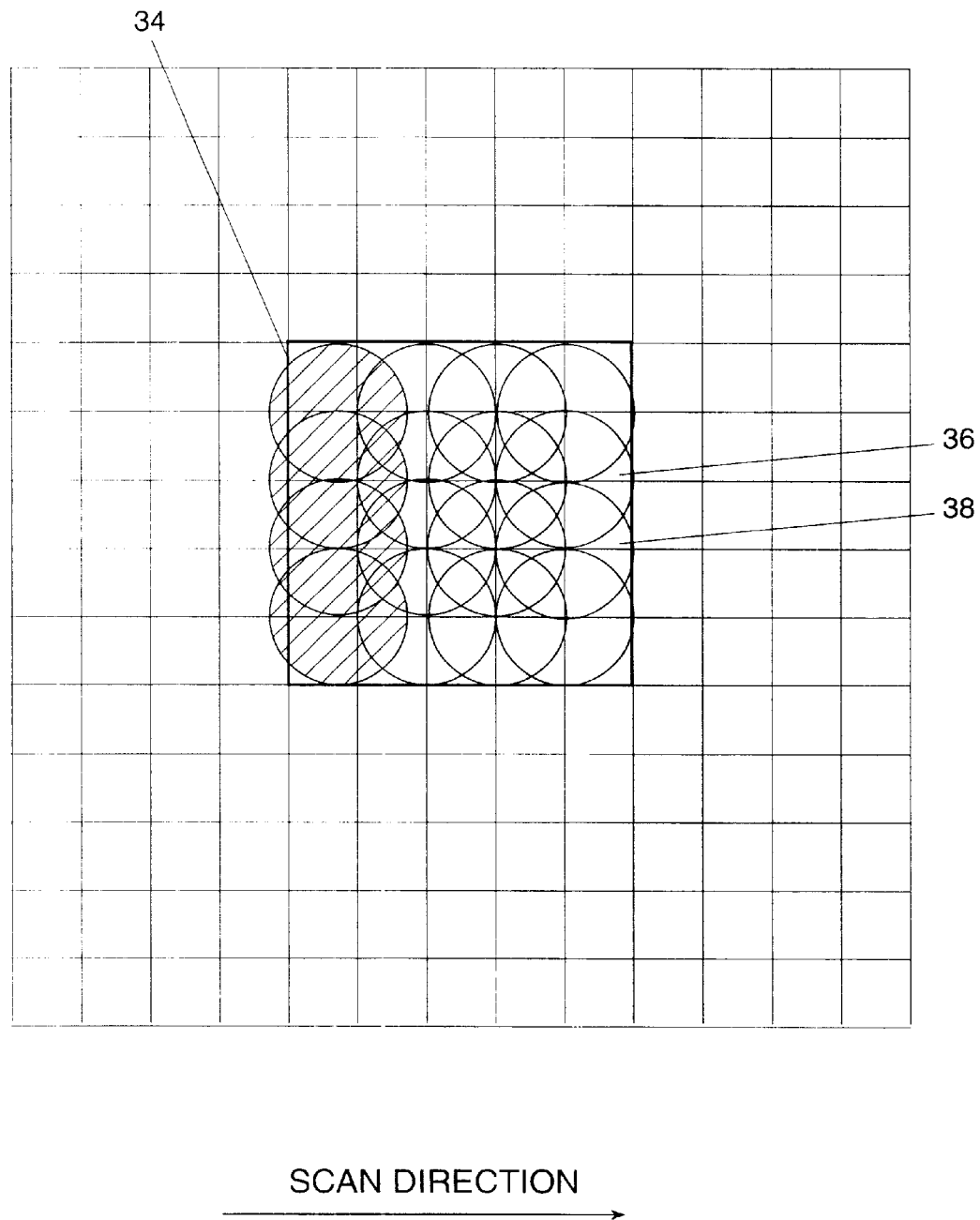
FIGS. 3B and 3C illustrate the principles of dot position control, according to the present invention, with respect to the half-tone spot of FIG. 3A.

FIG. 2B illustrates the marking scheme, according to the present invention, for half-tone spots, such as the one shown in FIG. 1B. The scheme is basically similar to the one described hereabove with reference to FIG. 2A. In the case of half-tone spots, however, the objective of boundary dot displacement is not only to achieve smoother edges, but also (and perhaps more importantly) to achieve finer control over the size of the spot (i.e. its marked area) and thus be able to smoothly reproduce a greater number of possible tonal values. The schematic drawing of the marking scheme, in FIG. 2B, and the typically resultant mark, in FIG. 2C, demonstrate smoothing of spot edges—at least edges inclined at relatively small angles from the cross-scan direction—by appropriately displacing boundary dots, such as dots 31 and 32. Clearly, this technique enables designing the screening function so that spots to reproduce any of the conventionally achievable tonal level may assume a relatively regular shape. This ability can be demonstrated with reference to FIGS. 3A and 3B, as follows: Suppose that, as illustrated in FIG. 3A by the solid circles, for one particular tonal level, all dots are centered on the regular grid, and together form a square-shaped spot, consisting of an array of 4×4 dots. For the next darker level, under conventional marking schemes, one whole dot, such as 35, marked by a dashed line in FIG. 3A, would be added to the periphery of the previous spot—resulting in an irregularly shaped spot. Using the marking technique of the present invention, however, as illustrated in FIG. 3B, the same next darker level can be effected by outwardly displacing all four dots, for example, at the left-hand boundary 34, each by about one fourth of the pitch, P, as illustrated by the shaded circles. Obviously, the new spot will again assume a regular (rectangular) shape.

Figure 3C:
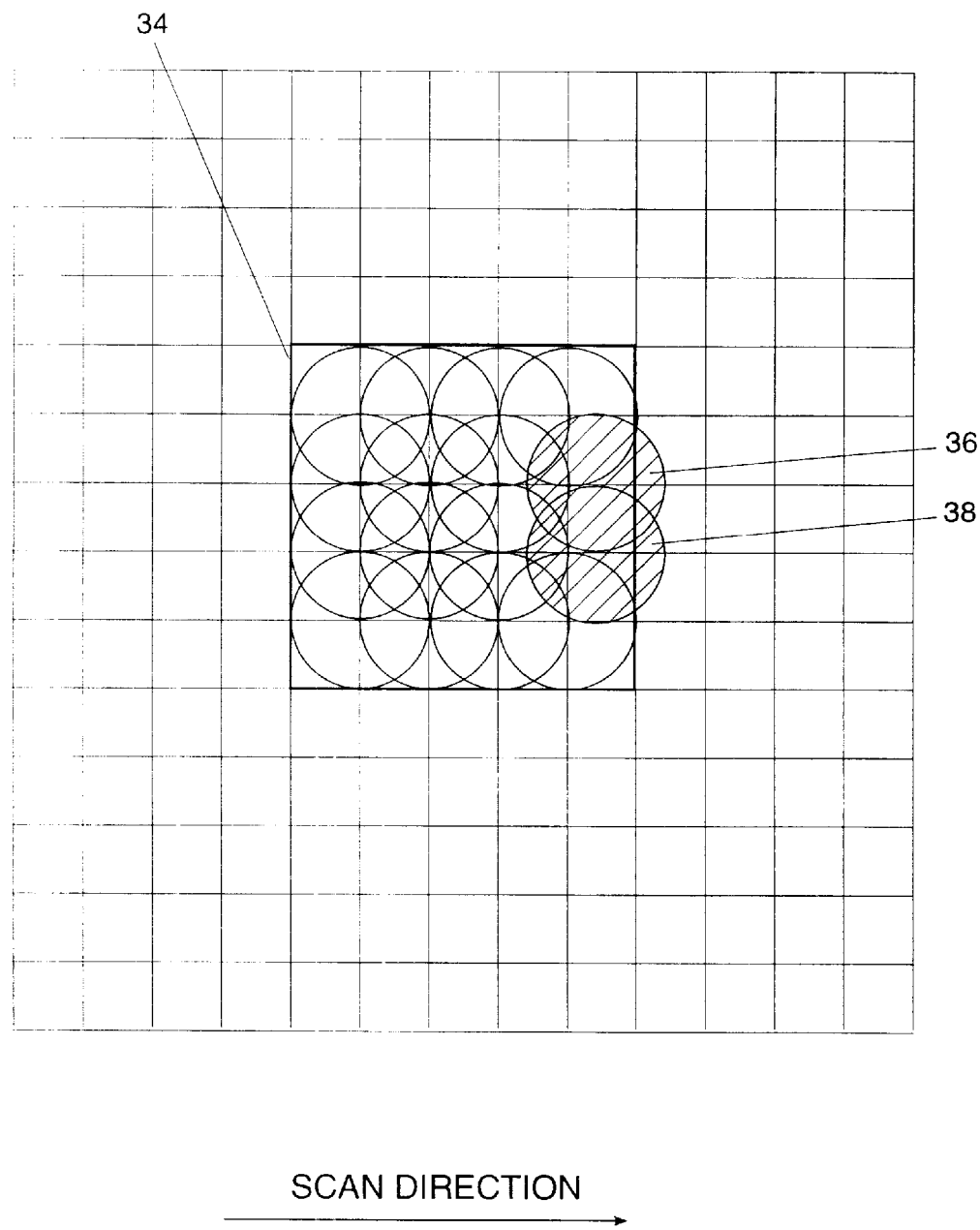

Using the marking technique of the present invention to achieve finer total gradation, and thus—a greater number of tonal values represented by single spots, will now be explained with reference to FIG. 3C. Starting, for example, again, with a regularly shaped spot of 4×4 dots (all represented by the solid circles), a next darker level may be achieved by outwardly displacing one boundary dot by a fraction of P; for example, dot 36 may be displaced by P/5, as shown by the corresponding dashed circle. For the next darker level, another dot, say dot 38, may be similarly displaced, and so on. Each such displacement causes the overall marked area of the spot to increase correspondingly and thus—the effected brightness level to shift down by one elementary unit. Dots along opposite boundary 34 may be similarly displaced, one after the another—to effect a marked spot of commensurately smaller area.

For a series of consecutive tonal levels, effected by gradual dot displacement, as described hereabove, there is a darkest level (corresponding to a maximal outward displacement of all affected boundary dots) and a lightest level (corresponding to a maximal inward displacement of all affected boundary dots) and a lightest level of a next darker group is effected by adding a commensurate number of whole dots to a boundary of the spot and shifting the dots to maximal inward displacements. Preferably the added dots would be along an additional marking line (e.g. along the top or bottom boundary of the spot of FIG. 3C). The respective lightest and darkest levels of consecutive groups are chosen, and the corresponding dot displacement designed, so that the difference between them is equal to the number of elementary level shifts effected by the additional whole dots, plus one. Suppose, for example, that to the spot of FIG. 3C, a row of four dots is added between two such consecutive groups. This, by itself, would cause darkening by 4×5=20 levels. Accordingly, the difference between the darkest level of the lighter group and the lightest level of the darker group should be 20−1=19 elementary units. One could then choose, for example, to effect the darkest level by outwardly displacing (across the two lateral boundaries) two dots by 2P/5 and another six dots—by P/5 (for a total shift of 10 elementary levels), while the lightest level would occur when inwardly displacing one dot by 2P/5 and another seven dots—by P/5 (for a total shift of 9 levels); clearly, these two levels by themselves differ by 10+9=19 level units.

It will be appreciated that the scheme presented above is exemplary only and that a great number of variations are possible, such as choosing different numbers and relative locations of dots displaced and different amount of displacement, as well as using different spot shapes, all coming within the scope of the present invention.

It is noted that, for most marking devices, namely those in which the marking head travels with respect to the medium, a shift of a dot position is effected by modifying the timing of the corresponding marking pulse; if the head travels from left to right, advancing the pulse shifts the marked dot to the left, whereas retarding the pulse shifts the dot to the right.

So far, the marking principles, and typical schemes for the structure of half-tone spots, according to the present invention have been explained. Practical methods for screening images (that is—for generating half-tone versions of given digitally represented images), based on such principles and schemes, will now be discussed.

A first preferred method is based on the conventional method for half-tone conversion, referred to in the background section as Method A, namely the one using a matrix of threshold values. According to the present invention, this conventional method is modified as follows: For each grid point (or nominal dot location) there are stored a plurality of threshold values—one for each possible placement of the corresponding dot (if present) relative to its grid point. For example, for the scheme described above with reference to FIG. 3C, the locations corresponding to dots 36 and 38 would each store five threshold values, which will correspond, respectively, to the nominal position, to two values of outward displacement (e.g. P/5 and 2P/5) and, similarly, to two values of inward displacement. During generation of a half-tone rendition of a particular image, the threshold values for each dot, in sequence, are compared with the locally valid image value and the results of the comparisons determine whether that dot will be marked at all and if so—at what relative position. In addition to the plurality of threshold values, there are also stored, for each grid point, three groups of control values, to be explained herebelow. As with the conventional threshold matrix method, there are thus actually stored values for only one segment (or supercell) of the screening grid, which is deemed to repeat itself regularly in both dimensions of the image area.

The method will be further explained with reference to FIG. 6A, which shows, by way of example, a portion of a typical matrix of stored values, namely the portion associated with a single cell within the screening function; these points correspond to the nominal locations of marked dots, within the spot associated with that cell. If the screening function is designed to have all cells (and resultant spots) identical, this matrix is a complete one—to be applied repeatedly to all cells in the image area; else, the complete matrix would include further sets of values, similar to the set in FIG. 6A, though with slight differences. For the sake of simplicity and clarity, this example is for the case of only nine grid points per cell (i.e. nine dots per largest spot) and only 22 possible tone levels in the image. Also in this example, the screening function is designed to positively render an image that is represented by darkness values (i.e. minimum for white and maximum for black).

Figure 6A:
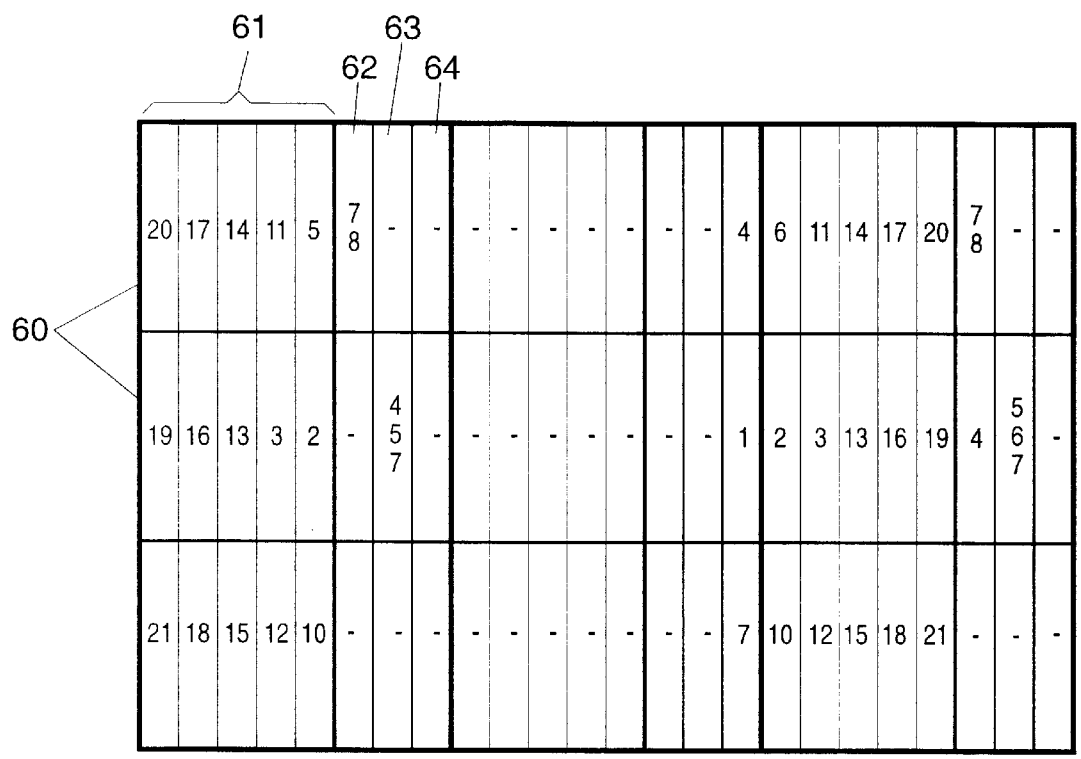
FIG. 6A shows an example of a stored matrix of values for the circuit of FIG. 5A.

There is shown in FIG. 6A a matrix of 3×3 value groups 60, each value group appearing within a corresponding major rectangle (outlined by heavy lines). Each such value group is associated with a particular grid point, in a corresponding matrix arrangement. In a preferred embodiment, each such value group is stored so as to be uniquely referenced by one address value. Each group consists of four sub-groups of values, which are shown in FIG. 6A within corresponding sub-rectangles. The first sub-group of values 61 is termed "thresholds", the second sub-group 62—"blank", the third sub-group 63—"inward" and the fourth sub-group 64—"On-grid". The second, third and fourth sub-groups will also be referred to collectively as "control".

The "thresholds" subgroup 61 consists, in the present case, of five values in a certain order, the five values being designated, according to their relative position in the subgroup, as first value, second value, etc. It is noted, as evident from FIG. 6A, that, similarly to conventional methods, there are generally lowest threshold values in the central group and higher values in the corner groups. The exact distribution of threshold values between the groups and within each "thresholds" subgroup is, however, unique and is such as to effect a marking scheme according to the present invention. Specifically, the first threshold value determines the image levels at which the corresponding dot will be positioned farthest left (2P/5) from its nominal location, the second value determines the image levels at which the dot will be positioned at an intermediate distance left (e.g. P/5) from nominal, the third value determines the levels at which the dot will be positioned at its nominal location (i.e. at the grid point), the fourth value—positioning intermediately right thereof and the fifth value—positioning farthest to the right. During the half-tone rendering process, a current image value is compared with each of the five threshold values; if it is lower than any, no dot is marked; if it is higher than one threshold value only, the dot is marked at double inward displacement; if it is higher than two values, the dot is marked at single inward displacement; and so forth, until when the image value is higher than the five threshold values, the dot is marked at double outward displacement. Thus, as a rule, the highest threshold, in a subgroup, that is exceeded by the image value determines the actual dot position.

The control subgroup of values act, at the presence of certain image values, to override the effects of the threshold subgroup. Specifically, the Blank subgroup causes the corresponding dot not to be marked; the Inward subgroup causes the dot to be positioned one place further inward than indicated; and to On-grip subgroup causes the dot to be marked at its grid point.

Figure 5A:
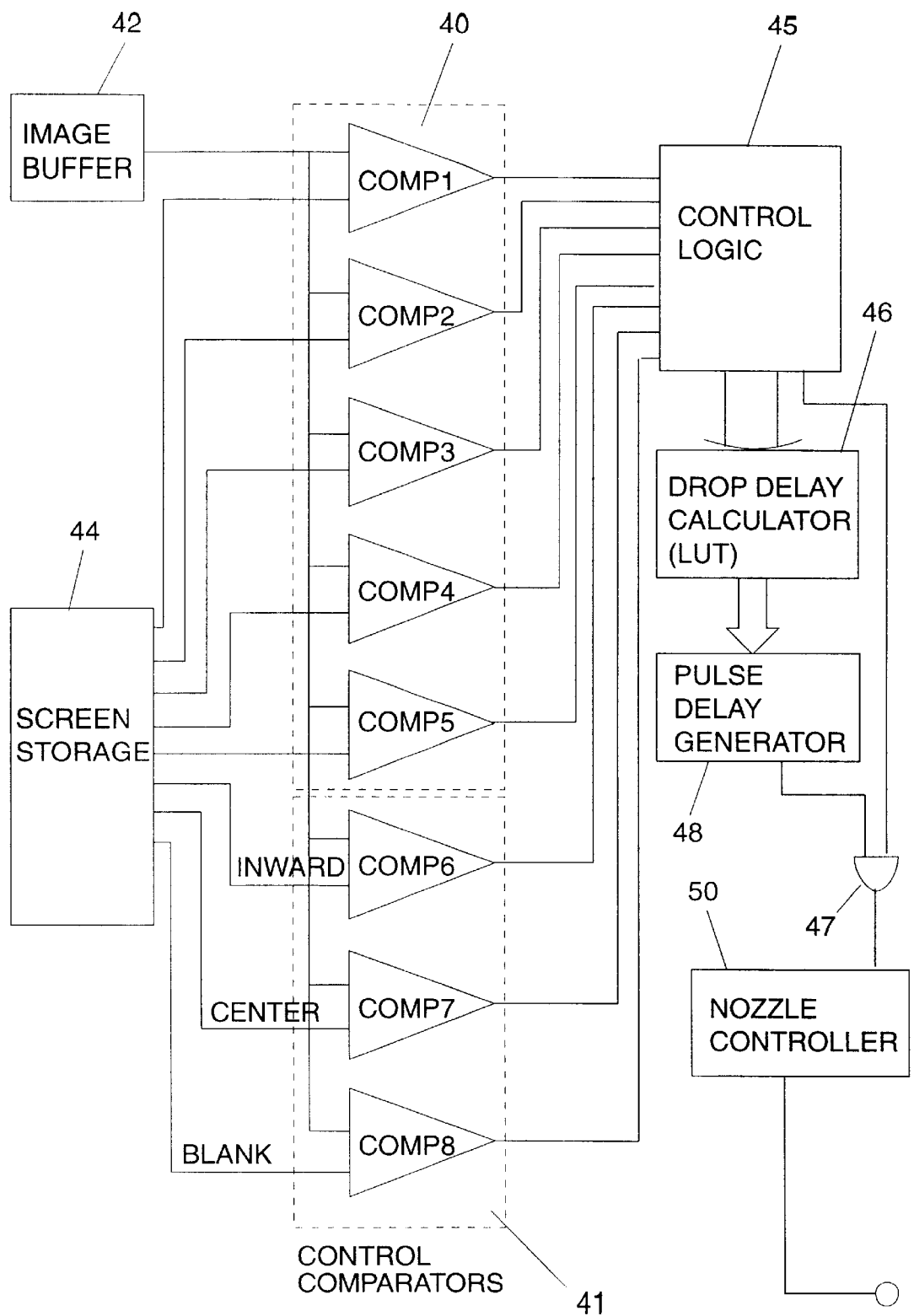
FIG. 5A is a block diagram of a circuit to carry out dot positioning according to another embodiment of the present invention.

A circuit to carry out a screening (i.e. half-tone rendered marking) process in an ink jet printer, using the stored information described hereabove, is shown in the block diagram of FIG. 5A. For each grid point in the image area to be marked, a corresponding group of values is retrieved from an appropriate location in a screen storage 44. The address of the particular storage location is calculated from the location of the grid point in a manner similar to that of prior art. A corresponding image value, obtained from an image buffer 42, is compared with the retrieved values, as follows: For each possible dot position (relative to the grid point), N (in the exemplary case, five) comparators 40 compare, each, the image value with a respective one of N threshold values in the retrieved threshold subgroup). At the same time, control comparators 41 compare the image value with the values in the retrieved control subgroups. The results of the comparisons are fed, through a combinatorial control logic module 45, to a gate 47, which selectively enables drop ejection, and to a drop delay calculate 46. The latter, by means of, say, a LUT, determines the corresponding dot displacement and feeds this parameter to a pulse delay generator 48, which, in turn, sends an appropriately timed pulse, through gate 47, to the nozzle controller 50—to cause a drop ejection. The table in FIG. 5B defines the logic of module 45: It is noted that the table states output values in terms of relative positions of marked dots; in the case of an ink-jet device (as well as other serially marking devices), the values may be stated in terms of the relative timing of marking pulses (and consequently—of drop ejection, or similar resultant marking action).

The effects of threshold- and control values on dot displacement, and thereby—on the shape of a half-tone spot, at various image values will now be examined in detail for the case illustrated by FIG. 6A (with reference to the table of FIG. 5B). For brevity, the examination is limited to a single spot; extension to other spots should be obvious, owing to the general repetitiveness of the screening function. It is noted that in this exemplary case there are five relative dot positions, namely as the grid point and at one fifth and two fifth of a pitch to the left, and to the right, of the grid point. For convenience, we shall refer to specific stored value groups, and their corresponding grid points, according to their corresponding major rectangles of FIG. 6A, namely as top-left, top, top right, left, central, etc.

At image level 0, no stored value is equaled or exceeded; hence, no dot is marked (rule 5), Image level 1 equals the value 1 that appears in the On-grid subgroup 64 of the central group (rightmost sub-rectangle of the central major rectangle); hence a dot is marked at the grid point corresponding to the central group (rule 2). All higher image values will likewise exceed the value 1 in the On-grid subgroup; hence a dot will continue to be marked at the central grid point.

Image level 2 equals a value in the fifth position in the threshold subgroup 61 of the left group, as well as a value in the first position in the threshold subgroup 61 of the right group; hence, a dot will be marked two-fifths pitch to the right of the left grid point and another dot—two-fifths pitch to the left of the right grid point (rule 4).

Image level 3 equals in the fourth position in the thresholds subgroup of the left group, as well as a value in the second position in the thresholds subgroup of the right group; hence, a dot will be marked one-fifth pitch to the right of the left grid point and another dot—one-fifth pitch to the left of the right grid point (rule 4).

Image level 4 equals the value that appears in the On-grid subgroup of the top group; hence a dot is marked at the corresponding grid point (rule 2); this condition will continue for all higher image levels. The image value also equals the value 4 that appears in the Inward subgroup of the left group; hence the corresponding dot will be marked at the innermost (i.e. rightmost) position, that is two-fifths pitch to the right of the grid point (rule 3); notice that this position is shifted back from that at image level 3. The image value also equals the value 4 that appears in the Blank subgroup of the right group; hence, no corresponding dot will be marked (rule 1).

At image level 5, the same conditions are obtained with respect to the left group (as well as the top group) as at level 4. The image value now also equals the threshold value of 5 at the fifth position in the top-left group; hence, a dot will be marked two-fifths pitch to the right of the top-left grid point (which is inward toward the dot at the top grid point). The image value now also equals the value 5 in the Inward subgroup 63 of the right group; hence the corresponding dot will be marked at a position one step further left than indicated by the threshold (which would be similar to that at level 3), that is two-fifths pitch to the left of the grid point (rule 3).

At image level 6, the following conditions are obtained for the noted groups and dots are marked accordingly: In the top-left group, threshold value 5, in the fifth place, is exceeded; hence dot is marked at rightmost position (rule 4). In the top-right group, threshold value 6, in the first place, is equaled; hence dot is marked at leftmost position (rule 4). In the left group, threshold value 3, in the fourth place, is exceeded; hence dot is marked one-fifth pitch to the right of the grid point (rule 4). In the right group, the image value equals the value 6 in the Inward subgroup; hence the dot will, again, be marked further left than at level 3 (rule 3).

The effects of higher image levels may be deduced from the matrix of FIG. 6A, on the basis of the rules of FIG. 5B, in a similar manner. It will be noticed that the resultant marked spot grows, with increasing image levels, in a gradual and nearly symmetrical manner—starting from the central dot (level 1), first growing to the left and to the right (levels 2 and 3), then (at level 4) adding a whole dot at the top while shrinking back at right and (slightly) at left, then (at levels 5 and 6) extending also the top dot to its left and right, followed (at level 7) by an additional dot at the bottom (with shrinkage, again, at left and right) and subsequent extension of the bottom dot, then further gradual extensions to the sides at the middle, top and bottom (repeatedly in that order). The area theoretically covered by the resultant spot at each level is given in the table of FIG. 6B, in units of the area of a single dot. It will be noticed that the difference between the spot areas at any adjacent levels, in this example, is two-fifths of a dot area. It will be appreciated that, if more intermediate tonal values are desired and if symmetrical growth is of less importance, the stored screening values could also be set so that the spot area increases from one image level to the next by one fifth of a dot area. Clearly, the area growth could be made even more gradual, if relative dot position could be set more finely (e.g. to allow 3 or more different displacements from the nominal (grid point) location.

A simplified version of the screening method described hereabove may be used when the objective is mainly to preserve symmetry or regularity of the spot shape at all tone levels, while it is not important to render intermediate tone values at all levels (as was the case represented by FIG. 6A). In this version, the stored values are threshold values only (i.e. there are no control values stored), as illustrated, for example, in the matrix of FIG. 6C, which has five threshold values for each matrix point. A spot then grows from one level to the next either by adding dots to both sides—first at innermost positions than at intermediate positions until reaching the grid-point position (thus enabling gradual growth)—or (at certain level transitions) by adding a dot each at the middle top and middle bottom of the spot (which causes a more pronounced transition).

Figure 7:
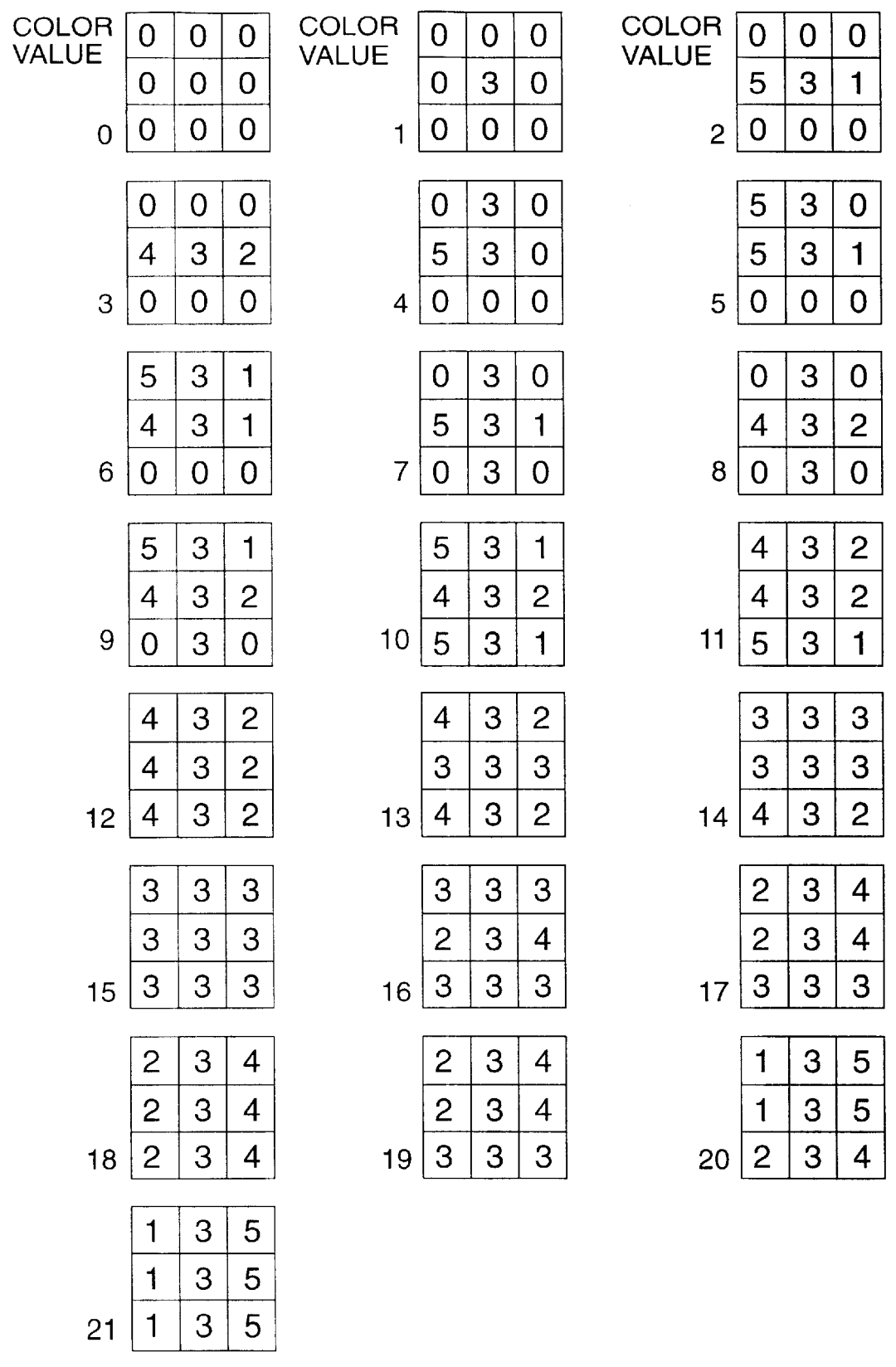

A second preferred screening method is based on conventional method B, described in the background section, namely the one that used dot patterns stored according to tonal values. In the conventional method, the stored patterns consist of only binary values—indicating whether corresponding dots are to be marked or not. According to the present invention, the method is modified so that values in the patterns have a range of N+1 (rather than just 2), where N is the number of possible dot positions relative to a grid point. If, as in the previously described examples, N=5, the values in the stored patterns may range from 0 to 5; in this case, for example, the value 0 signifies that no dot to be marked, the value 1 denotes marking a dot at a position two-fifths of a pitch to the left of the grid point, 2 denotes a dot one-fifth of a pitch to the left of the grid point, 3 denotes marking a dot at the grid point and, similarly, 4 and 5 denote respective positions to the right of the grid point. FIG. 7 presents an example of a set of such patterns for the case of nine dots per cell and 22 possible tonal values (which was also considered as an example in the description of the first screening method hereabove). In fact, the pattern of FIG. 7, when using the second method, would yield exactly the same spot shape as would be obtained from the screening function of FIG. 6A, using the first method.

Figure 4A:
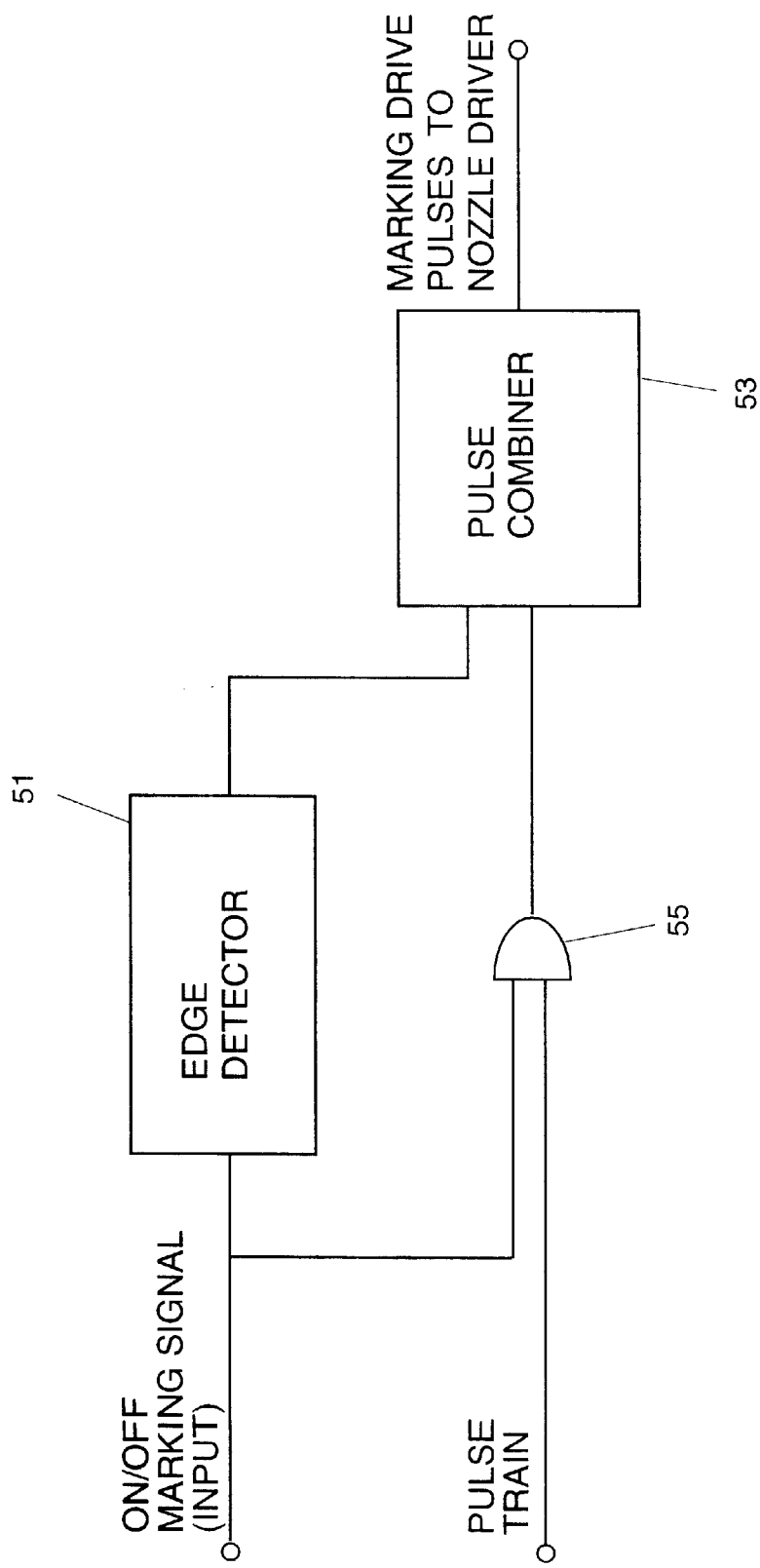
FIG. 4A is a block diagram of a circuit to carry out dot positioning according to one embodiment of the present invention.

A third screening method according to the present invention is based on that of the '143 patent, described in the background section hereabove. According to the '143 patent, an analog signal, representing the screening function and derived for each marking line from stored data, is continuously compared with an analog signal representing the image along that line; the binary sense of the comparison results determines at each point along the line whether it is marked or not. As will be recalled, this method is suitable for a device capable of marking continuously. The present invention calls for radically modifying this method so as to make it usable by a pulsed device, such as an ink-jet printer, as follows: The binary signal resulting from the comparison, alongside a regular train of pulses, are fed to a logic circuit, illustrated in FIG. 4A, which includes an edge detector 51, a pulse combiner 53 and a gate 55. The binary signal and the pulse train are applied to gate 55, which, accordingly transmits to pulse combiner 53 train pules as long as the signal has the "mark" sense, but does not transmit pules when the signal has the "blank" sense. The binary signal is also applied to edge detector 51, which generates a pulse (called edge pulse), and inputs it to pulse combiner 53, immediately upon each transition of the signal from one sense to the other. Pulse combiner 53 generates an output pulse (at some constant delay) for each edge pulse and also for each train pulse, except as follows: Whenever the time difference between an edge pulse and the nearest train pulse is less than a certain threshold value (which usually is slightly less than half a train period), no output pulse is generated for the train pulse. The output pulses from pulse combiner 53, also called marking pulses, are applied to the driver of the marking device (causing, for example, the ejection of corresponding ink drops).

Figure 4B:
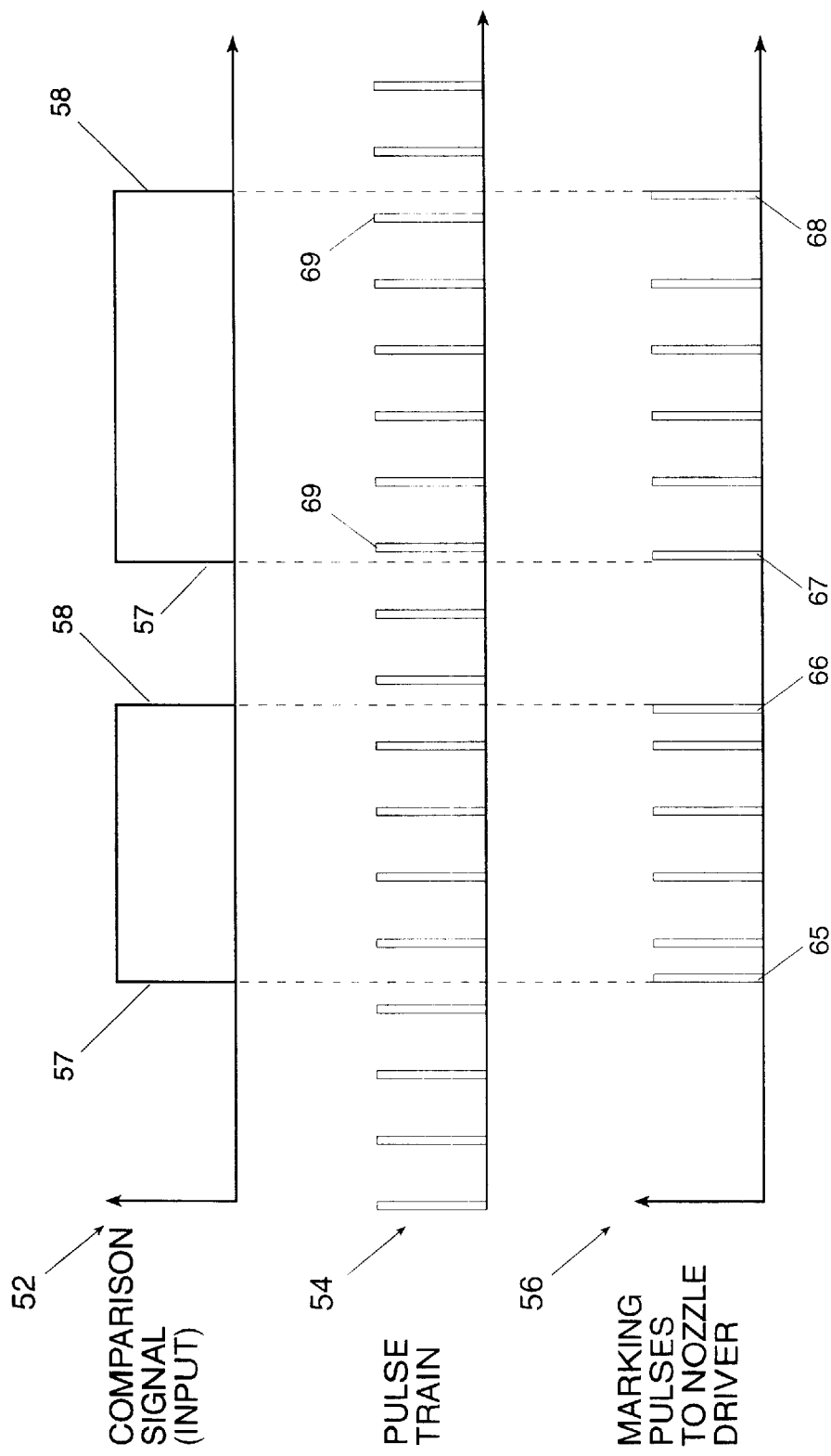
FIG. 4B is a timing diagram for some signals in the circuit of FIG. 4A.

The timing diagram of FIG. 4B shows the relations between the binary comparison signal 52, the pulse train 54 and the marking drive pulses 56, for some typical cases. It is readily seen that whenever the comparison signal switches from "blank" to "mark", such as at times 57, or from "mark" to "blank", such as times 58, a marking pulse, to be referred to as a boundary pulse, is immediately generated, such as pulses 65, 66, 67 and 68. In addition, while the comparison signal is in the mark sense, there is a marking pulse generated synchronously with each train pulse, except when the interval between such a train pulse and a boundary pulse (be it preceding or succeeding) is small (say, less than half the train period), as is the case, for example, with pulses 69. It is noted that this latter situation is akin to advancing or retarding (as the case may be) the corresponding marking pulse, to become the boundary pulse, such as pulses 67 and 68, (thus effecting an outward displacement of the corresponding dot); It is also noted that the case in which a train-synchronous marking pulse is generated owing to a sufficient time interval from an adjacent boundary pulse, the latter is akin to adding a retarded or advanced pulse (thus effecting an additional dot with inward displacement).

Another possible screening method according to the present invention is based on that of the '828 patent, described in the background section hereabove. According to the '828 patent, locations of spot boundary points, relative to the screen period, along each marking line are obtained, in correspondence with current image values, directly from storage and the marking device is turned on or off accordingly. The present invention calls for modifying also this method, so as to make it usable by a pulsed device, the modification being similar to that described hereabove with respect to the '143 patent and using the same logic circuit, namely: Instead of the comparison signal, used in the previously described method, the logical marking signal (which, according to the '828 patent, would directly control the continuous marking device) is fed to the logic circuit of FIG. 4A, together with a pulse train, and the effects are as described hereabove.

It is noted that the marking scheme described hitherto calls for displacing boundary dots only. It is, however, possible within the scope of the present invention to also displace more dots along the marking line, by appropriately timing their respective driving pulses, so as to achieve a better distribution of dot overlap area and therefore—of mark density (e.g. ink coverage). For example, it may be stipulated that for any displacement of a boundary dot, its neighboring dot along the marking line (if not itself a boundary dot or a neighbor of another boundary dot) be displaced in the same direction by half the amount.

Figure 8:
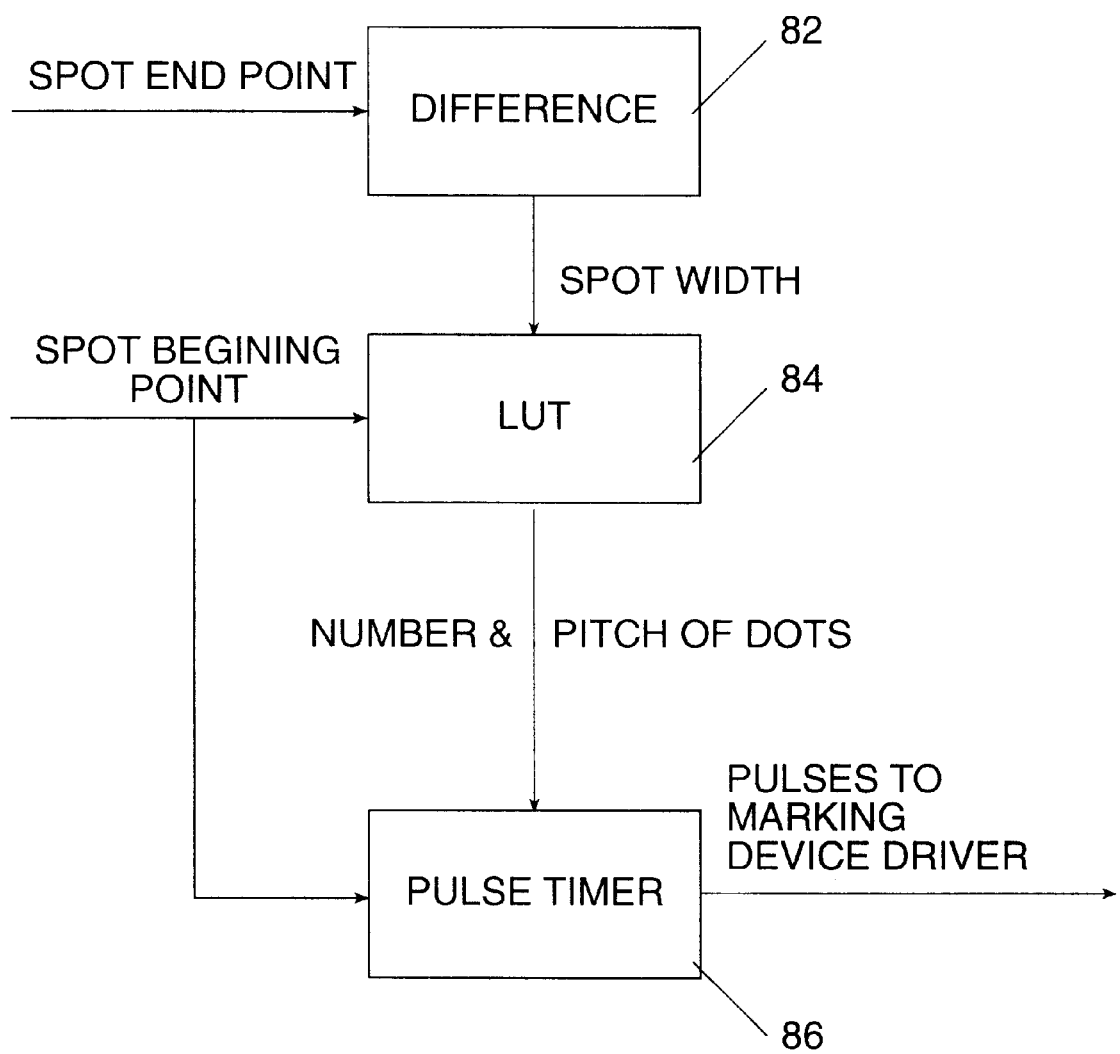
FIG. 8 is a block diagram of a preferred embodiment of a variation of the method of the present invention.

One particular multidot displacement scheme calls for all dots across the spot to be displaced so that their centers be equidistant from each other. This scheme is particularly practical in conjunction with a modification of the screening method of the '143 patent, which will now be explained with reference to the block diagram of FIG. 8: As before, the locations of the beginning and end points of marked areas along a marking line are computed from relative location values obtained from storage. Now the locations of each pair of points are applied to a difference calculator 82, whose output, representing the desired width of the respective mark, is applied to a look-up table (LUT) 84. Correspondingly, two values are read out from LUT 84, namely the number of dots to be marked and their pitch (i.e. the distance between their centers. Clearly, these two values are always such that the width of the resultant mark closely approximates the width calculated in 82 and such that the pitch remains reasonably close to the nominal dot marking pitch of the device. These two values, as well as the mark beginning point, are applied to a pulse timing circuit 86, which accordingly generates the specified number of timing pulses, at a frequency corresponding to the specified pitch, the timing of the first pulse corresponding to the mark beginning point. The timing pulses from circuit 86 are applied to the drive pulse generator of the marking device. In a preferred embodiment, there is a finite number of possible values for the dot pitch and therefore—for the pulse frequency; the various frequencies are fed as pulse trains to pulse timing circuit 86 and, according to the input from LUT 84, an appropriate one of these trains is gated out and subjected to the specified pulse count.

While the invention has been described with respect to a limited number of embodiments, it will be appreciated that many variations, modifications and other applications of the invention may be made.

We claim:

1. A method for rendering an electrically input image on a medium by a marking device that is operative, in response to, and synchronous with, drive pulses applied thereto, to selectively mark dots on the medium, each dot uniquely corresponding to an applied drive pulse, contiguous marked dots forming marked areas and any dot in a marked area that is adjacent to an unmarked area being a boundary dot, at least a portion of the rendered image being a half-tone image, contiguous marked areas therein forming half-tone spots within screen cells, the method comprising:

defining over the plane of the image a raster of regularly spaced grid lines and, along each line, a pattern of grid points, spaced at a constant pitch, applying drive pulses to the device, for marking dots on the medium, each dot to be uniquely associated with one of said grid points, the pulses being timed so that the center of at least one boundary dot is essentially displaced from its associated grid point and so that the centers of all dots within a marked area that are not boundary dots lie essentially at corresponding grid points, the direction and magnitude of displacement of any of said at least one boundary dot being determined so as to at least partially affect the shape of the corresponding half-tone spot.

2. The method of claim 1, whereby the marking device is operative to scan the medium at constant scanning velocity, the method further comprising:

generating a train of regularly spaced clock pulses, their period being equal to said constant pitch divided by the scanning velocity;

for each dot to be marked with its center at a grid point, generating a drive pulse in synchronism with one of said clock pulses, and for each dot to be marked with its center displaced from its associated grid point, generating a drive pulse at a commensurate time difference from a corresponding one of said clock pulses.

3. The method of claim 1, whereby the input image is represented by a binary signal, which alternates between a marking state and a non-marking state and whereby the marking device is operative to scan the medium along parallel lines at constant scanning velocity, the method further comprising:

generating a train of regularly spaced clock pulses, their period being equal to said constant pitch divided by the scanning velocity;

generating a drive pulse upon each state transition, in said binary signal, and a drive pulse for each of said clock pulses that occurs during a marking state of said binary signal and that is not closer than a specified minimal interval to the time of any state transition in said binary signal.

4. A method for rendering an electrically input image as a half-tone image on a medium by a marking device that is operative, in response to drive pulses applied thereto, to selectively mark dots on the medium, along each line of a raster of parallel lines, each dot uniquely corresponding to, and synchronous with, an applied drive pulse, clusters of adjacent marked dots, along any line, forming marked segments, any two successive marked segments being separated by unmarked segments and a dot in a marked segment that is adjacent to an unmarked segment being a boundary dot, the method comprising:

applying drive pulses to the device, for selectively marking dots on the medium, the pulses being timed so that the center-to-center distance, along a line, within at least one first pair of adjacent marked dots is essentially different from the center-to-center distance, along a line, within at least one second pair of adjacent marked dots along a line, wherein at least one of each of said at least one first pair is a boundary dot, the method further comprising:

defining, along each line, a plurality of grid points, spaced at a constant pitch, and uniquely associating each marked dot with one of said grid points;

further timing said drive pulses so that the centers of both dots of any of said at least one second pair lie essentially at corresponding grid points and the center of at least one boundary dot lies essentially displaced from its corresponding grid point, and wherein the input image is represented by an array of pixels, the method further comprising:

defining a screening function, over the area of the rendered image, as a repetitive array of adjacent identical elementary screening functions, each defined over a section of said area;

for each grid point within any of said sections, storing a plurality of threshold values, in conformity with said elementary screening function; and for each grid point along a line:

retrieving the corresponding threshold values from storage and comparing them with the value of the corresponding pixel;

from the results of the comparisons, determining whether a dot is to be marked and, if yes, at what position, with respect to the grid point, its center should be; and if a dot is to be marked, further timing the corresponding drive pulse so that the center of the dot falls at the position thus determined.

5. The method of claim 4, wherein, for one or more grid points within said section:

said storing further includes storing also at least one control value;

said retrieving further includes retrieving also any corresponding control value; and said determining includes determining also from retrieved control values.

6. A system for rendering an electrically input image on a medium, comprising:

a marking device, operative to scan the medium, along each line of a raster of parallel lines, at constant scanning velocity and further operative, in response to, and synchronously with, drive pulses applied thereto, to selectively mark dots on the medium, each dot uniquely corresponding to an applied drive pulse, contiguous marked dots forming marked areas and any dot in a marked area that is adjacent to an unmarked area being a boundary dot; and a pulse generator, for applying drive pulses to said marking device, including:

a generator of regularly spaced clock pulses; and a pulse gating circuit, receptive to said clock pulses and operative to output a drive pulse, synchronous with one of said clock pulses, for each dot to be marked that is not a boundary dot, and a drive pulse that is not necessarily synchronous with any of said clock pulses, for at least one dot to be marked that is a boundary dot, wherein at least a portion of the rendered image is a half-tone image, the system further comprising a screen generator, including storage of a screening function, said screen generator being operative to control said pulse generator in conformance with said screening function.

7. The system of claim 6, whereby the input image is formed as an array of pixel values and the area on the medium to be marked is conceptually divided into an array of contiguous sections, wherein said screening function is defined over the area of a section and said screen generator is further operative to repeatedly read out values from said storage.

8. The system of claim 7, wherein said screening function is represented by an array of groups of N threshold values each, where N>1, and said screen generator further includes N comparators and a logic circuit, receptive to outputs of all of said comparators, and is further operative to retrieve from said storage one complete group of said threshold values just prior to each of said clock pulses and to apply each of the retrieved threshold values to a corresponding one of said comparators, each of said comparators being operative to compare one of said threshold values with a corresponding pixel value and said logic circuit being operative to control said pulse gating circuit according to the outputs of said N comparators.

9. The system of claim 8, wherein:

with each of said groups there is stored also one or more control values;

said screen generator is further operative to retrieve from said storage also any of said control values; and said logic circuit is further operative to control said pulse gating circuit also according to retrieved control values.

10. The system of claim 7, whereby any pixel value is one of a finite set of values, wherein:

said screening function is represented by one array of marking values for each possible pixel value, each marking value in any array being from a finite set of values and uniquely corresponding to a possibly marked dot within any section of the marking area, and said screen generator is further operative, with respect to each possible dot and to any input pixel to be rendered thereby, to:

address a location in said storage that corresponds to the value of the respective pixel;

retrieve from an addressed storage location a marking value, corresponding to the dot; and control the outputting of a corresponding drive pulse and its timing, with respect to a nearest clock pulse, according to the retrieved marking value.

11. The system of claim 7, whereby any pixel value is one of a finite set of values, wherein:

said screening function is represented by one array of position values for each possible pixel value, each position value in any array indicating the position, within any section, of a boundary dot to be marked; and said screen generator is further operative, with respect to any line, along which the device is scanning, with respect to any of said sections across which the device is scanning and with respect to any input pixel to be rendered therein:

to address a location in said storage that corresponds to the respective pixel;

to retrieve from an addressed storage location all position values relating to the position of the line, with respect to the section;

for each retrieved position value, to cause said pulse gating circuit to output a drive pulse that is not necessarily synchronous with any of said clock pulses, it being a boundary drive pulse, whose timing, with respect to the scanning of the section, is commensurate with the retrieved position value; and while said device is scanning any area to be marked, to cause said pulse gating circuit to output additional drive pulses, synchronously with corresponding ones of said clock pulses.

12. The system of claim 7, whereby any pixel value is one of a finite set of values, wherein:

said screening function is represented by one array of position values for each possible pixel value, each position value in any array indicating the position, within any section, of a boundary dot to be marked, said generator of regularly spaced clock pulses is operative to output trains of clock pulses having controllably variable frequency and phase, and said screen generator is further operative, with respect to any line, along which the device is scanning, and with respect to any of said sections across which the device is scanning:

to address a location in said storage that corresponds to any pixel to be rendered;

to retrieve from any addressed storage location all position values relating to the position of the line, with respect to the section; and for any pair of consecutive retrieved position values, which indicate the beginning and end, respectively, of a segment to be marked, to cause said pulse generator to output a train of regularly spaced drive pulses, such that the timing of each of the first pulse and the last pulse of the train, relative to the scanning of the section, corresponds to the respective one of the position values.

13. The system of claim 16, whereby the input image is represented by a continuous analog image signal along each line of the raster, wherein said screening function is represented by an array of threshold values and said screen generator further includes an analog signal generator and a comparator, receptive to the image signal and to the output of said analog signal generator and connected at its output to said pulse gating circuit;

said screen generator being further operative, with respect to any line, along which the device is scanning, and with respect to any of said sections, across which the device is scanning, to:

retrieve from said storage location a plurality of threshold values; and apply all retrieved threshold values to said analog signal generator, for generating a continuous threshold signal;

said comparator being operative to compare the image signal with said threshold signal and accordingly to generate a binary signal, which alternates between a marking state and a non-marking state; and said pulse gating circuit being further operative to output:

a drive pulse that is not necessarily synchronous with any of said clock pulses for each state transition in said binary signal, and a drive pulse synchronous with any of said clock pulses, if it occurs during a marking state of said binary signal and is not closer than a specified minimal interval to the time of any state transition in said binary signal.

14. A method for rendering an electrically input image on a medium by a marking device that is operative, in response to, and synchronous with, drive pulses applied thereto, to selectively mark dots on the medium, each dot uniquely corresponding to an applied drive pulse, contiguous marked dots forming marked areas and any dot in a marked area that is adjacent to an unmarked area being a boundary dot, the method comprising:

defining over the plane of the image a raster of regularly spaced grid lines and, along each line, a pattern of grid points, spaced at a constant pitch, applying drive pulses to the device, for marking dots on the medium, each dot to be uniquely associated with one of said grid points, the pulses being timed so that the center of at least one boundary dot is essentially displaced from its associated grid point and so that the centers of all dots within a marked area that are not boundary dots lie essentially at corresponding grid points, wherein the input image is represented by a binary signal which alternates between a marking state and a non-marking state, and wherein the marking device is operative to scan the medium along parallel lines at constant scanning velocity, the method further comprising:

generating a train of regularly spaced clock pulses, their period being equal to said constant pitch divided by the scanning velocity;

generating a drive pulse upon each state transition, in said binary signal, and a drive pulse for each of said clock pulses that occurs during a marking state of said binary signal and that is not closer than a specified minimal interval to the time of any state transition in said binary signal.

15. A method for rendering an electrically input image as a half-tone image on a medium by a marking device that is operative, in response to drive pulses applied thereto, to selectively mark dots on the medium, along each line of a raster of parallel lines, each dot uniquely corresponding to, and synchronous with, an applied drive pulse, clusters of adjacent marked dots, along any line, forming marked segments, any two successive marked segments being separated by unmarked segments and a dot in a marked segment that is adjacent to an unmarked segment being a boundary dot, the method comprising:

applying drive pulses to the device, for selectively marking dots on the medium, the pulses being timed so that the center-to-center distance, along a line, within at least one first pair of adjacent marked dots is essentially different from the center-to-center distance, along a line, within at least one second pair of adjacent marked dots along a line, wherein at least one dot of each of said at least one first pair is a boundary dot, the method further comprising:

defining, along each line, a plurality of grid points, spaced at a constant pitch, and uniquely associating each marked dot with one of said grid points;

further timing said drive pulses so that the centers of both dots of any of said at least one second pair lie essentially at corresponding grid points and the center of at least one boundary dot lies essentially displaced from its corresponding grid point, wherein the input image is represented by an array of pixels, each having one of a finite set of values, the method further comprising:

defining a screening function over the area of the rendered image as a repetitive array of adjacent identical elementary screening functions, each defined over a section of said area;

for each possible pixel value, storing an array of marking values, one marking value for each grid point within said section, in conformity with said elementary screening function; and for each grid point along a line:

retrieving the corresponding marking value from storage and determining accordingly whether a dot is to be marked and, if yes, at what position, with respect to the grid point, its center should be; and if a dot is to be marked, further timing the corresponding drive pulse so that the center of the dot falls at the position thus determined.

16. A method for rendering an electrically input image as a half-tone image on a medium by a marking device that is operative, in response to drive pulses applied thereto, to selectively mark dots on the medium, along each line of a raster of parallel lines, each dot uniquely corresponding to, and synchronous with, an applied drive pulse, clusters of adjacent marked dots, along any line, forming marked segments, any two successive marked segments being separated by unmarked segments and a dot in a marked segment that is adjacent to an unmarked segment being a boundary dot, the method comprising:

applying drive pulses to the device, for selectively marking dots on the medium, the pulses being timed so that the center-to-center distance, along a line, within at least one first pair of adjacent marked dots is essentially different from the center-to-center distance, along a line, within at least one second pair of adjacent marked dots along a line, wherein at least one dot of each of said at least one first pair is a boundary dot, the method further comprising:

defining, along each line, a plurality of grid points, spaced at a constant pitch, and uniquely associating each marked dot with one of said grid points;

further timing said drive pulses so that the centers of both dots of any of said at least one second pair lie essentially at corresponding grid points and the center of at least one boundary dot lies essentially displaced from its corresponding grid point, and wherein the input image is represented by an array of pixels, each having one of a finite set of values, the method still further comprising:

defining a screening function over the area of the rendered image as a repetitive array of adjacent identical elementary screening functions, each defined over a section of said area;

for each possible pixel value, storing a plurality of position values in conformity with said elementary screening function, each position value representing a position of the center of a boundary dot with respect to said section;

for each repetition of said section along each marking line, retrieving corresponding position values from storage;

for each position value retrieved, applying a drive pulse to the device, timed so as to mark a boundary dot at a corresponding position along the respective marking line, said position not being necessarily at a grid point;

applying additional drive pulses to the device, timed so as to mark corresponding additional dots between sequential boundary dots, each additional dot being centered on its associated grid point.

17. A method for rendering an electrically input image as a half-tone image on a medium by a marking device that is operative, in response to drive pulses applied thereto, to selectively mark dots on the medium, along each line of a raster of parallel lines, each dot uniquely corresponding to, and synchronous with, an applied drive pulse, clusters of adjacent marked dots, along any line, forming marked segments, any two successive marked segments being separated by unmarked segments and a dot in a marked segment that is adjacent to an unmarked segment being a boundary dot, the method comprising:

applying drive pulses to the device, for selectively marking dots on the medium, the pulses being timed so that the center-to-center distance, along a line, within at least one first pair of adjacent marked dots is essentially different from the center-to-center distance, along a line, within at least one second pair of adjacent marked dots along a line, wherein the input image is represented by an array of pixels, each having one of a finite set of values, the method further comprising:

defining a screening function over the area of the rendered image as a repetitive array of adjacent identical elementary screening functions, each defined over a section of said area;

for each possible pixel value, storing a plurality of position values in conformity with said screening function, each position value representing a position of the center of a boundary dot with respect to said section;

for each repetition of said section along each marking line, retrieving corresponding position values from storage;

for each position value retrieved, applying a drive pulse to the device, timed so as to mark a boundary dot at a corresponding position along the respective marking line;

for one or more pairs of boundary dots thus sequentially marked along a line, applying additional drive pulses to the devices for marking corresponding additional dots between the boundary dots, timed so that the centers of all additional dots and of the boundary dots are essentially equidistant.

18. A method for rendering an electrically input image as a half-tone image on a medium by a marking device that is operative, in response to drive pulses applied thereto, to selectively mark dots on the medium, along each line of a raster of parallel lines, each dot uniquely corresponding to, and synchronous with, an applied drive pulse, clusters of adjacent marked dots, along any line, forming marked segments, any two successive marked segments being separated by unmarked segments and a dot in marked segment that is adjacent to an unmarked segment being a boundary dot, the method comprising:

applying drive pulses to the drive, for selectively marking dots on the medium, the pulses being timed so that the center-to-center distance, along a line, within at least one first pair of adjacent marked dots is essentially different from the center-to-center distance, along a line, within at least one second pair of adjacent marked dots along a line, wherein at least one dot of each of said at least one first pair is a boundary dot, the method further comprising:

defining, along each line, a plurality of grid points, spaced at a constant pitch, and uniquely associating each marked dot with one of said grid points;

further timing said drive pulses so that the centers of both dots of any of said at least one second pair lie essentially at corresponding grid points and the center of at least one boundary dot lies essentially displaced from its corresponding grid point, and wherein the marking device is further operative to scan the medium along the raster lines at constant scanning velocity and whereby the input image is represented by a continuous image signal along each line of the raster, the method still further comprising:

generating a continuous screening signal, representing a screening function;

generating a train of regularly spaced clock pulses, their period being equal to said constant pitch divided by the scanning velocity; and for each raster line:

comparing said image signal with said screening signal and accordingly generating a binary signal, which alternates between a marking state and a non-marking state; and generating a drive pulse upon each state transition, in said binary signal, and a drive pulse for each of said clock pulses that occurs during a marking state of said binary signal and that is not closer than a specified minimal interval to the time of any state transition in said binary signal.

19. A system for rendering an electrically input image on a medium, comprising:

a marking device, operative to scan the medium, along each line of a raster of parallel lines, at constant scanning velocity and further operative, in response to, and synchronously with, drive pulses applied thereto, to selectively mark dots on the medium, each dot uniquely corresponding to an applied drive pulse, contiguous marked dots forming marked areas and any dot in a marked area that is adjacent to an unmarked area being a boundary dot; and a pulse generator, for applying drive pulses to said marking device, including:

a generator of regularly spaced clock pulses; and a pulse gating circuit, receptive to said clock pulses and operative to output a drive pulse, synchronous with one of said clock pulses, for each dot to be marked that is not a boundary dot, and a drive pulse that is not necessarily synchronous with any of said clock pulses, for at least one dot to be marked that is a boundary dot, wherein the input image is represented by a binary signal which alternates between a marking state and a non-marking state, and wherein said pulse gating circuit is further operative to output:

a drive pulse that is not necessarily synchronous with any of said clock pulses for each state transition in the binary signal; and a drive pulse synchronous with any of said clock pulses that occurs during a marking state of said binary signal and not closer than a specified minimal interval to the time of any state transition in said binary signal.

\* \* \* \* \*

UNITED STATES PATENT AND TRADEMARK OFFICE
CERTIFICATE OF CORRECTION

PATENT NO. : 6,266,079 B1
DATED : July 24, 2001
INVENTOR(S) : Gershony et al.

Page 1 of 1

It is certified that error appears in the above-identified patent and that said Letters Patent is hereby corrected as shown below:

<u>Column 21, claim 4,</u>
Line 31, the word "dot" was omitted between "one........of"

Signed and Sealed this

Sixteenth Day of April, 2002

Attest:

JAMES E. ROGAN
*Director of the United States Patent and Trademark Office*

*Attesting Officer*